(12) United States Patent
Libsch et al.

(10) Patent No.: US 12,270,777 B2
(45) Date of Patent: Apr. 8, 2025

(54) 2D MICROFLUIDIC STRUCTURE

(71) Applicant: International Business Machines Corporation, Armonk, NY (US)

(72) Inventors: Frank Robert Libsch, White Plains, NY (US); Venkat K. Balagurusamy, Airmont, NY (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 18/215,501

(22) Filed: Jun. 28, 2023

(65) Prior Publication Data

US 2025/0003913 A1 Jan. 2, 2025

(51) Int. Cl.
*G01N 27/22* (2006.01)

(52) U.S. Cl.
CPC ......... *G01N 27/226* (2013.01); *G01N 27/221* (2013.01)

(58) Field of Classification Search
CPC .... G01N 27/226; G01N 27/221; G01N 22/00; G01N 23/00; G01N 27/00; G01N 27/403; G01N 27/28; G01N 27/22; G01N 2027/222; G01N 27/227; G01N 27/228; G01N 27/26; G01N 27/27; G01N 27/4161; G01N 27/4166; G01N 27/417; G01N 27/419; G01N 27/4175; G01N 27/4163; G01N 27/4162; G01N 27/026; G01N 27/028; G09G 3/348; G09G 3/3486; G09G 3/3493; H01H 2061/006; H01H 2029/008; H01H 1/0036; H01H 29/28
See application file for complete search history.

(56) References Cited

U.S. PATENT DOCUMENTS

| | | | |
|---|---|---|---|
| 6,987,263 | B2 | 1/2006 | Hobbs et al. |
| 7,163,612 | B2 | 1/2007 | Sterling et al. |
| 7,563,614 | B2 | 7/2009 | Orwar et al. |
| 8,547,111 | B2 | 10/2013 | Hadwen et al. |
| 8,563,325 | B1 | 10/2013 | Bartsch et al. |
| 8,614,707 | B2 | 12/2013 | Warsito et al. |
| 9,441,308 | B2 | 9/2016 | Ludwig |
| 9,535,001 | B2 | 1/2017 | Kuninori et al. |

(Continued)

FOREIGN PATENT DOCUMENTS

WO 2008120135 A2 10/2008

OTHER PUBLICATIONS

Tkaczyk, A. H., et al., "Microfluidic Droplet Consistency Monitoring and Cell Detection via Laser Excitation", J Mech Med Biol., Mar. 2011, pp. 1-14, 11(1).

(Continued)

*Primary Examiner* — Alvaro E Fortich
(74) *Attorney, Agent, or Firm* — Scully, Scott, Murphy & Presser, P.C.; Samuel Waldbaum

(57) ABSTRACT

A 2D microfluidic structure for capacitance sensing of analyte is provided. The structure includes a first substrate located above at least one microfluidic channel, and a second substrate located below the at least one microfluidic channel. The first substrate includes at least one first group of three isolated electrodes and the second substrate includes at least one second group of three isolated electrodes, where each group of isolated electrodes includes a ground electrode and two probe electrodes.

20 Claims, 15 Drawing Sheets

(56) References Cited

U.S. PATENT DOCUMENTS

| | | | |
|---|---|---|---|
| 11,325,119 B2 | 5/2022 | Ng Pitti et al. | |
| 2005/0210962 A1* | 9/2005 | Bohm | B01L 3/502715 73/53.01 |
| 2006/0088941 A1 | 4/2006 | Law et al. | |
| 2007/0275193 A1 | 11/2007 | DeSimone et al. | |
| 2008/0121045 A1 | 5/2008 | Cole et al. | |
| 2008/0131327 A1* | 6/2008 | Van Dam | B01L 9/527 422/400 |
| 2013/0085365 A1 | 4/2013 | Marashdeh et al. | |
| 2016/0334323 A1* | 11/2016 | McGuinness | G01N 27/06 |
| 2018/0164261 A1* | 6/2018 | Fan | G01N 30/6095 |
| 2019/0329255 A1* | 10/2019 | Edwards | B01L 3/502753 |
| 2021/0324316 A1 | 10/2021 | Daniele et al. | |

OTHER PUBLICATIONS

Srivastava, N., et al., "Electronic drop sensing in microfluidic devices: automated operation of a nanoliter viscometer", Lab Chip, Mar. 2006, pp. 744-751, 6.

Nguyen, N.-T., et al., "Optical detection for droplet size control in microfluidic droplet-based analysis systems", Sensors and Actuators B, January 2006, pp. 431-436, 117.

Luo, C., et al., "Picoliter-volume aqueous droplets in oil: Electrochemical detection and yeast cell electroporation", Electrophoresis, Accepted Nov. 28, 2005, pp. 1977-1983, 27.

Cole, M. C., et al., "Multiplexed electrical sensor arrays in microfluidic networks", Sensors and Actuators B, Available online Dec. 14, 2008, pp. 350-358, 136.

Wang, F., et al., "Multiphase Bioreaction Microsystem with Automated On-Chip Droplet Operation", Lab Chip., May 21, 2010, pp. 1308-1315, 10(10).

Hoeber, R., "A second method to measure the conductivity inside cells", From the Physiological Institute of the University of Kiel, 1912, pp. 189-221, English-language abstract.

Hoeber, R., "Measurements of the inner conductivity of cells", From the Physiological Institute of the University of Kiel, 1913, pp. 15-45, English-language abstract.

Hoeber, R., "A method to measure the electrical conductivity inside cells", From the Physiological Institute of the University of Kiel, 1910, pp. 237-,253 English-language abstract.

* cited by examiner

2D MICROFLUIDIC STRUCTURE

BACKGROUND

The present application relates to capacitive sensing, and more particularly to a two dimensional (2D) microfluidic structure, and a system that contains the same.

Over the last century, a number of techniques have been developed which allow the measurement of the dielectric properties of biological particles in a fluid suspension. Most of these techniques are limited by the fact that they only provide an average value for the dielectric properties of a collection of particles.

Notably, emphasis has been placed on the electrokinetic development methods (movement and/or rotation while suspended under and electric field) of single cell analysis, with primary emphasis on dielectrophoresis (DEP) and electrorotation (ROT). In general, particles such as cells form a temporary dipole, resulting in a movement of the particle under an electric field (DEP) or in rotation (ROT) where the particle dipole tries to align itself with a changing electric field. In practice it is difficult to measure the DEP force directly because of parallel Brownian motion and electrically induced assay flow. Instead, a real and imaginary part of the Clausius-Massotti crossover frequency factor is measured for the DEP and ROT, respectively, as a function of medium conductivity. This factor provides sufficient information to determine the dielectric properties. Limitations of DEP and ROT require both measurements of crossover frequency as well as electrorotation spectrum. A further limitation is the required slowness in measurement speed, usually multiple seconds per cell that affects throughput. In addition, one must rely also on lab bench optical imaging equipment, using microscopes or more recently, outfitted with high-speed cameras. These systems require good optical contrast between the particles being detected and the ambient background fluid, often restricting cells to transparency holders, and as such, only observing surface particles, not bulk particles. Also, other limitations besides being large and bulky, and therefore confined to a laboratory environment (not mobile for in-field use), detection resolution is limited in several ways: (1) detection is a 2D image, not usually able to reliably detect particle in depth, and (2) submicron size particle that are below the optical diffraction limit go undetected.

On the other hand, today's electrical sensing provides a scalable, low power, cost effective, and mobile in-field alternative. Electrical detection of microdroplets can be considered a simpler version of impedance spectroscopy which uses both resistive and capacitive components to detect signal to retrieve size of particles, viability of cells, membrane properties, etc. The presence and size of microdroplets and particles can be detected in a similar manner provided microdroplets or particles have different conductivity and permittivity than the ambient background fluid. Resistive detection limitations arise when the required direct contact sensing electrodes are contaminated by the microdroplets/particles or background fluid, such as oil residue or other higher conductivity particles that limits the smaller conductivity detection of the intended microdroplets/particles.

In contrast, capacitive sensing to measure the dielectric properties can be sensitively done with passivated electrodes that prevent direct contact with the microdroplets or particles, thus eliminating the possibility of contamination. Particles measured may be large or small such as nanoparticles, viruses, and other biological organisms, since the optical diffraction limit does not apply. Further, inorganic electrochemical impedance, where a time-based electrochemical transformation is ongoing, is doable as well.

SUMMARY

A 2D microfluidic structure for capacitance sensing of one or more substances of interest (i.e., one or more analytes) is provided. The 2D microfluidic structure can be used to measure the dielectric properties of one or more analysts.

In one aspect of the present application, a 2D microfluidic structure is provided. In one embodiment, the 2D microfluidic structure includes a first substrate located above at least one microfluidic channel. The 2D microfluidic structure further includes a second substrate located below the at least one microfluidic channel. In accordance with the present application, the first substrate includes at least one first group of three isolated electrodes and the second substrate includes at least one second group of three isolated electrodes. The at least one first group of three isolated electrodes and the at least one second group of three isolated electrodes each includes a ground electrode and two probe electrodes.

In another aspect of the present application, a system for sensing an analyte is provided. In one embodiment, the system includes the aforementioned 2D microfluidic structure, an integrated sensing circuit electrically connected to the 2D microfluidic structure, and an integrated reconfigurable crossbar switch electrically connected to the 2D microfluidic structure.

BRIEF DESCRIPTION OF THE DRAWINGS

FIG. 13 is schematic drawing illustrating an integrated microfluidic sensing system that can be employed in accordance with an embodiment of the present application.

DETAILED DESCRIPTION

Figure 1:
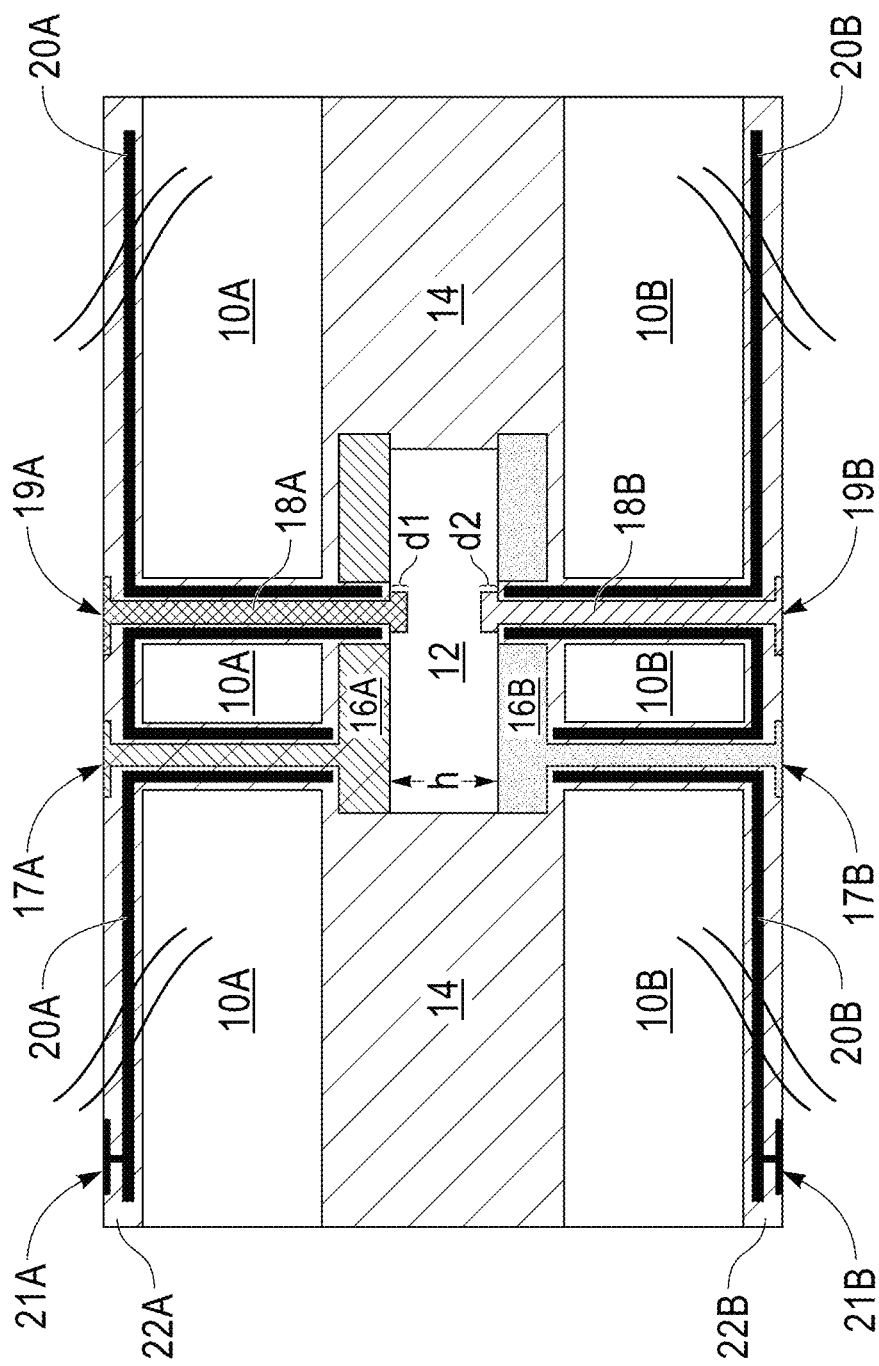
FIG. 1 is cross sectional view illustrating a single element microfluidic cell of the present application, the single element microfluidic cell includes a first substrate located above a microfluidic channel, and a second substrate located below the microfluidic channel, wherein the first substrate includes a first group of three isolated electrodes and the second substrate includes a second group of three isolated electrodes, each group of three isolated electrodes includes a ground electrode and two probe electrodes.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are group forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

The basic principle of an electrical based sensor is that either a current or voltage applied stimulus to selected electrode(s) in contact with the material measures the opposition of that material to the stimulus, thus giving a unique impedance. The unique impedance in turn is sensed or measured by the same or other electrode(s) which help identify the material or aspects of the material. Impedance is a complex number that has a real (resistance) and an imaginary (reactance) component. The capacitance component, i.e., reactance, is influenced by a change in position, or properties of the material, or even frequency of the stimulus. Capacitive sensors are realized by varying any of the three parameters of a capacitor; distance between the plates (d), area of the capacitive plates (A), and dielectric constant ($e_r$). In this principle, different kinds of sensors have been developed.

Traditional capacitance probes can suffer from possible interference of other charged surfaces in their vicinity, experience a reduction in the signal-to-noise (S/N) ratio associated with the parasitic capacitance of the structure and/or electrical leads to the sensor, are large and require a sizable liquid or gas sample, making them unscalable, cannot detect single particle sensor/electronics for pre-scribed in-body ailment diagnosis, and possibly treatment, sensor/electronics lack of communication with external system transmitter/receiver, for example in a user case where in body/in subject transit and/or just before/after in body/in subject transit, and not amenable to measurements on conducting liquids complicated by ionic conductivity and the effects of electrode polarization.

The disclosed 2D microfluidic structure overcomes the above noted issues/challenges with existing capacitance probes. Notably, the disclosed 2D microfluidic structure has a grounded perimeter surrounding all single probe electrodes, eliminating interference from adjacent surfaces, can enable an identical size reference capacitor, that allows a more sensitive differencing measurement between reference and source, and allows zeroing of all capacitance sources before actual sample measurement, has microelectronic fabrication scaling and uses substantially less sample, where both the microfluidic channel and the electrodes are scalable in proportion to the dimension of a single particle size being detected, which requires substantially smaller quantities of liquid or gas assay being analyzed, scalable to nanoparticle detection in size and single particle detection in quantity by enabled scalability of both the microfluidic channel and the electrodes, scalable to ultra-small dimension relative to application allows real time and point of detection capable, and eliminates previous capacitor sensor measurement issues with conducting liquids that are complicated by ionic conductivity and the effects of electrode polarization. The disclosed structure of at least three or more electrodes overcomes electrode polarization problems by measuring the voltage drop away from the capacitive plates and thereby avoiding the double (Helmholtz) layer.

In the simplest implementation, the disclosed 2D microfluidic structure measures reactance with sensor design parameters of d and A, and measures $e_r$. In addition, the disclosed 2D microfluidic structure, measurement method, and fabrication technique enables two or more physically and electrically identical or precisely ratioed sensors working together in the same microfluidic channel that make it now possible to have the following attributes: (1) Built in reference sensor cell that calibrates-out all parasitic capacitance of sensing cell. (2) Allows differential sensing at the same time (produces most sensitive detection). This results in the lowest concentration sensing of a second element (e.g., particles) in a first element liquid or gas. This also results in earliest detection of a "growing" or changing second element/species in a first element liquid or gas and enables mobile in-field detection by eliminating the previous in-lab hours-to-days of incubation and particle population growth required for detection (i.e., lowers concentration detection limit). (3) Separation of the stimulus probes from the sensing probes now enables the same sensor to perform particle impedance measurements not only for non-conducting liquids and gas assays, but also for conducting liquids and gas assays (i.e., overcomes previous electrode polarization limitations). (4) Electrodes are guarded that eliminate prior art electromagnetic interference issues and adjacent electrode crosstalk, and its resulting error. (5) An integrated and guarded sensor with transducer and differential sensing enables scaling not only of the microfluidic channel and probe for submicron particle sizes, but also enables detection from minute sample sizes and/or lower concentrations that are below previous sample size requirements (i.e., lowers particle size detection limit, lowers sample size limit, lowers low level concentration limit).

A 2D microfluidic structure is provided which is capable of capacitance sensing. In one embodiment (and as illustrated for example, in FIG. 1), the 2D microfluidic structure includes first substrate 10A located above at least one microfluidic channel 12. The 2D microfluidic structure further includes second substrate 10B located below the at least one microfluidic channel 12. In accordance with the present application, the first substrate 10A includes at least one first group of three isolated electrodes (16A, 18A and 20A) and the second substrate 10B includes at least one second group of three isolated electrodes (16B, 18B and 20B). The at least one first group of three isolated electrodes and the at least one second group of three isolated electrodes each includes a ground electrode (20A, 20B) and two probe electrodes (16A, 16B and 18A, 18B). In the present application, each first group of three isolated electrodes and each second group of three isolated electrodes define a single microfluidic cell of the present application. In the present application, the term "isolated electrodes" denotes electrodes that are electrically isolated from each other.

Within FIG. 1, a single element microfluidic cell of the present application is illustrated. Although FIG. 1 describes and illustrates a single element microfluidic cell, the present application is not limited to such a cell. Instead, multiple microfluidic cells are contemplated in which each of the multiple microfluidic cells includes the first group of three isolated electrodes and the second group of three isolated electrodes as illustrated in the single element microfluidic cell shown in FIG. 1. When multiple microfluidic cells are employed, those cells include one or more microfluidic channels 12 that are present between first and second substrates 10A, 10B.

The single element microfluidic cell illustrated in FIG. 1 includes first substrate 10A located above microfluidic channel 12, and second substrate 10B located below the microfluidic channel 12. The microfluidic channel 12 is a cavity or chamber that exists between the first substrate 10A and the second substrate 10B. In embodiments of the present application, a gas or liquid (or other sample) containing one or more substances (or analytes as defined herein below) of interest can flow through the microfluidic channel 12 and be sensed by the probe electrodes. Notably, the probe electrodes are employed in the present application for capacitance sensing.

The first substrate 10A can be composed of a first substrate material, and the second substrate 10B can be composed of a second substrate material. In some embodiments of the present application, the first substrate material that provides the first substrate 10A is compositionally the same as the second substrate material that provides the second substrate 10B. In other embodiments, the first substrate material that provides the first substrate 10A is compositionally different from the second substrate material that provides the second substrate 10B. Exemplary first substrate materials and second substrate materials that can be employed in the present application include, but are not limited to, a semiconductor material, an electrically insulating material, a combination of a semiconductor material and an electrically insulating material.

The term "semiconductor material" is used throughout the present application to denote a material that has semiconducting properties. Examples of semiconductor materials that can be used as the first substrate material and the second substrate mater include, but are not limited to, silicon (Si), a silicon germanium (SiGe) alloy, a silicon germanium carbide (SiGeC) alloy, germanium (Ge), III/V compound semiconductors or II/VI compound semiconductors. In one example, the first substrate material and the second substrate material are both composed entirely of silicon.

Exemplary electrically insulating materials that can be employed as the first substrate material and the second substrate material include, but are not limited to, glass or a polymer. Exemplary polymers that can be employed in the present application include, but are not limited to, poly (ethylene terephthalate) (PET), poly(butylene terephthalate) (PBT), poly(enthylene naphthalate) (PEN), polycarbonate (PC), polyimides (PI), polysulfones (PSO), and poly(p-phenylene ether sulfone) (PES).

In some embodiments, the first substrate 10A and the second substrate 10B are both transparent. Transparent substrates provide for a visual inspection and/or analysis of the one or more substances that pass through the microfluidic channel 12. In other embodiments, in which the first substrate 10A or the second substrate 10B represents the top substrate, the top substrate is transparent and the bottom substrate can be transparent or non-transparent. Exemplary transparent substrate materials include glass and/or the polymers mentioned above. Semiconductor materials are exemplary non-transparent substrate materials. If transparency is desired in a substrate for optical viewing, monitoring, measuring, etc., the first group of one or more of the at least three isolated electrodes on the first (top) substrate 10A and/or the second group of one or more of the at least three isolated electrodes on the second (bottom) substrate 10B can be made of transparent conducting electrode materials, such as indium tin oxide (ITO), zinc oxide, etc.

The microfluidic channel 12 can be laterally surrounded by a spacing element 14. Spacing element 14 not only controls the spacing between the first substrate 10A and the second substrate 10B, but determines the height, h, of the microfluidic channel 12. When multiple microfluidic channels 12 are present, the spacing element 14 can also be used to space apart at least some of the microfluidic channels 12. The microfluidic channels 12 can be connected to each other without any spacing element 14 present therebetween such that the microfluidic channel 12 passes through multiple microfluidic cells. In some embodiments of the present application, the spacing element 14 is a dielectric material such as, for example, silicon dioxide, silicon nitride, silicon nitride and/or a low dielectric constant (k) material, the term "low k" denotes a dielectric material having a dielectric constant of less than 4.0 as measured under vacuum. In other embodiments of the present application, the spacing element 14 is a gasket, a spacer ball, solder or other planar deposited or molded material.

In the present application, the height, h, of the microfluidic channel 12 is typically from sub-micron to centimeters, with a height from 1 micron to 500 microns being even more typical. In the present application, the height, h, of the microfluidic channel 12 can be designed to a desired height dependent on what substance(s) needs to be detected. For example, a small height, h, of the microfluidic channel 12 can be used to detect small quantities of a substance or substances in a liquid or gas that passes through the microfluidic channel 12.

As is illustrated, the first substrate 10A includes a first group of three isolated electrodes 16A, 18A and 20A and the second substrate includes a second group of three isolated electrodes 16B, 18B and 20B. Each group of three isolated electrodes includes a ground electrode and two probe (or sensing) electrodes. That is, the first group of three isolated electrodes includes second ground electrode 20A, and two probe electrodes referred to herein a third probe electrode 16A and a fourth probe electrode 18A. The second group of three isolated electrodes includes first ground electrode 20B, and two probe electrodes referred to herein a first probe electrode 16B and a second probe electrode 18B. The first, second, third and fourth designation are used herein since the illustrated single microfluidic cell includes a total of 4 probe electrodes, two atop the microfluidic channel 12 and two beneath the microfluidic channel 12. It is noted that three electrodes within each (i.e., the first and second) group of three isolated electrodes represents the minimum number of electrodes that are present in each of the first group and second group of three isolated electrodes. The present application contemplates embodiments in which greater than 3 electrodes are present in each of the first group and second group of three isolated electrodes. When greater three electrodes are present in each of the first group and second group of three isolated electrodes, at least one of the electrodes is a ground electrode and the other electrodes are probe electrodes. In embodiments of the present application, the number of electrodes within the first group of three isolated electrodes is equal to the number of electrodes in the second group of three isolated electrodes.

In accordance with the present application, a first probe electrode of the first group of three isolated electrodes is mated, i.e., paired, with a first probe electrode of the second group of three isolated electrodes, and the second probe electrode of the first group of three isolated electrodes is mated with a second probe electrode of the second group of three isolated electrodes. Notably, probe electrode 16A is mated with probe electrode 16B, and probe electrode 18A is mated with probe electrode 18B. Throughout the present application, the term "mated" denotes that the probe electrodes are paired and have a cooperative working relationship with each other. One implementation can use probe electrodes 16A and 16B as the electrical stimulus probes where a certain electrical excitation exists between them ranging from a DC bias to an AC bias (sin wave, square or trapezoidal pulse, etc.) and probe electrodes 18A and 18B as the (capacitance, impedance, etc.) measurement probes. It should be noted that for the example above, the probes used for measurement (i.e., probe electrodes 18A, 18B) can perform DC and/or AC measurements.

In some embodiments of the present application, the first probe electrode of the first group of three isolated electrodes is vertically aligned with the first probe electrode of the second group of three isolated electrodes, and the second probe electrode of the first group of three isolated electrodes is vertically aligned with the second probe electrode of the second group of three isolated electrodes. Notably, probe electrode 16A is vertically aligned with probe electrode 16B, and probe electrode 18A is vertically aligned with probe electrode 18B.

In other embodiments, the first probe electrode of the first group of three isolated electrodes is vertically offset from the first probe electrode of the second group of three isolated electrodes, and the second probe electrode of the first group of three isolated electrodes is vertically offset from the second probe electrode of the second group of three isolated electrodes. Notably, probe electrode 16A is vertically offset from probe electrode 16B, and probe electrode 18A is vertically offset from probe electrode 18B. In the present application, the offset can include some vertical overlapping (in a spaced apart relationship) of the two mated probe electrodes.

In the present application, the electrodes of the first group of three isolated electrodes and the electrodes of the second group of three isolated electrodes include a vertical element that is present in a though-via that passes entirely through the first substrate 10A and the second substrate 10B. The electrodes in the through-via can be coaxial or a single metal. In the present application, each probe electrode can be coaxed with the ground electrode. The coaxial embodiment adds additional electromagnetic shielding to the electrodes that are present in the through-via.

As is illustrated, each electrode 16A, 18A, 20A of the first group of three isolated electrodes includes a contact pad 17A, 19A, 21A, and each electrode 16B, 18B, 20B of the second group of three isolated electrodes includes a contact pad 17B, 19B, 21B. Each corresponding contact pad and electrode combination is typically of unitary construction and is typically composed of same electrically conductive material. The contact pads can be used to electrically connect the various electrodes of the first group of three isolated electrodes and the second group of three isolated electrodes to external circuity and/or external devices. In some embodiments, signal wires can be formed and use to electrically connect via the corresponding contact pad each of the electrodes of the first and second groups of three isolated electrodes to external circuitry.

In some embodiments of the present application, the electrically conductive material that provides the electrodes 16A, 16B, 18A, 18B, 20A, 20B and the contact pads 17A, 17B, 19A, 19B, 21A, 21B is composed of a non-transparent electrically conductive material such as, for example, copper (Cu), platinum (Pt), gold (Au), silver (Ag), nickel (Ni), tungsten (W), aluminum (Al) or alloys thereof. In other embodiments of the present application, the electrically conductive material that provides each of the electrodes 16A, 16B, 18A, 18B, 20A, 20B and the contact pads 17A, 17B, 19A, 19B, 21A, 21B is composed of a transparent electrically conductive material such as, for example, indium tin oxide (ITO), zinc oxide, cadmium oxide, or titanium oxide. In other embodiments, the electrically conductive electrodes can be passivated (with oxides formed on the conductive probe, such as aluminum oxide or aluminum probes or tantalum nitride from for tantalum probes) with the aim of not reacting with the fluid in microfluidic channel 12 or be made of inert materials (such as Au or Pt).

In some embodiments of the present application, the ground electrodes 20A, 20B are composed of a compositionally same electrically conductive material as each of the probe electrodes 16A, 16B, 18A, and 18B. In other embodiments of the present application the ground electrodes 20A, 20B are composed of a compositionally different electrically conductive material than each of the probe electrodes 16A, 16B, 18A, and 18B.

In some embodiments of the present application and as illustrated in FIG. 1, one of the probe electrodes of the first group of three isolated electrodes, i.e., third probe electrode 18A, extends a first depth, d1, into the microfluidic channel 12, while one of the probe electrodes of the second group of three isolated electrodes, i.e., second probe electrode 18B, extends a second depth, d2, into the microfluidic channel 12. By designing the probe electrodes such as, for example, the third probe electrode 18A and the second probe electrode 18B, to extend into the microfluidic channel 12, the charged Helmholz layer effect and polarization error of conducting liquids (such as, for example, DNA, proteins, etc.) can be eliminated. In some embodiments, only one of the probe electrodes, e.g., the third probe electrode 18A or second probe element 18B extends into the microfluidic channel 12. In yet other embodiments, none of the probe electrodes extends into the microfluidic channel 12.

In the present application, some of the probe electrodes, i.e., the first probe electrode 16A, and the second probe electrode 16B, can be designed to have probe head that has a greater surface area than the other probe electrodes, i.e., the third probe electrode 18A and the second probe electrode 18B. Larger probe heads (large in contact area) can be more desirable for a larger and/or more uniform stimulus or measurement signal. The smaller probe head (small in contact area) can be more desirable for the least probe-to-channel fluid interaction.

In the present application, and notwithstanding the number of electrodes within the first group of three isolated electrodes and the second group of three isolated electrodes, each electrode of the first group of three isolated electrodes is an electrically insulated electrode that is encased in a first electrically insulating layer 22A, and each electrode of the second group of three isolated electrodes is an electrically insulated electrode that is encased in a second electrically insulating layer 22A; the sensing surface and the contact pad of each electrode does not include any electrically insulator material thereon. The first electrically insulating layer 22A and the second electrically insulating layer 22B are composed of one or more dielectric materials such as, for example, silicon dioxide, silicon nitride, and/or a low dielectric constant (low k) material such as organosilicate glass. The dielectric material(s) that provides the first electrically conductive insulating layer 22A can be compositionally the same as, or different from, the dielectric material that provides the second electrically insulating layer 22B.

The single element microfluidic cell of the present application can be formed utilizing processing techniques that are well known to those skilled in semiconductor manufacturing. In the present application, the first substrate 10A can be processed to include the first group of three isolated electrodes 16A, 18A, 20A that are electrically isolated from each other, and the second substrate 10B can be processed to include the second group of three isolated electrodes 16A, 18A, 20A that are electrically isolated from each other. This processing can include forming at least two through-vias into the first and second semiconductor materials, and various metallization steps that include insulator material deposition, electrically conductive material deposition (e.g., seed layer deposition and plating), and lithography patterning. The processing can provide non-coaxial or coaxial probe electrodes. The lithography patterning includes one or more etching processes.

Spacing element 14 can then be formed on of, or both of, the processed substrates, e.g., first substrate 10A, and a bonding processing can be used to bond the two processed substrates together.

Figure 2A:
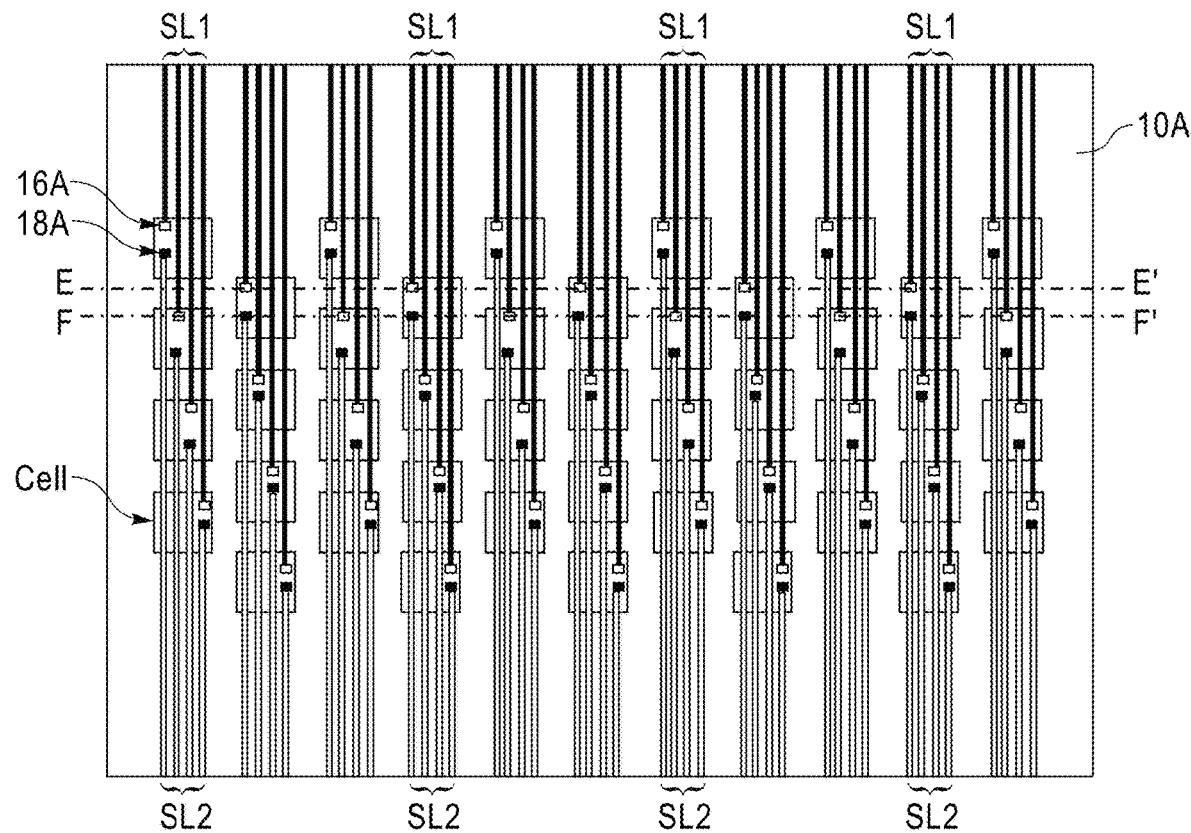
FIG. 2A is a top down view illustrating a 2D sensor array architecture for a first substrate containing in-line probe electrodes (the ground electrode is not shown) in accordance with an embodiment of the present application; cuts E-E' and F-F' are shown.

Referring now to FIG. 2A, there is illustrated a 2D sensor array architecture for first substrate 10A having multiple microfluidic cells containing in-line probe electrodes; the ground electrode 20A is not shown. Multiple microfluidic cells (one of which is shown in FIG. 1 by way of an example) are present in the illustrated embodiment. The multiple microfluidic cells are arranged in rows (left to right) and columns (top to bottom). The microfluidic cells in a given column are in-line with each other. Within each column of cells and in the illustrated embodiment, a first group of four signal lines, SL1, is shown. Each individual signal line of the first group of signal lines, SL1, is electrically connected to a fourth probe electrode 16A that is present in each cell within a given column of cells. Within each column of cells, a second group of four signal lines, SL2, is shown. Each individual signal line of the second group of signal lines, SL2, is electrically connected to a third probe electrode 18A that is present in each cell within a given column of cells. FIG. 2A includes a cut E-E' which passes (from left to right) through alternative microfluidic cells and a cut F-F' that passes (from left to right) through each of microfluidic cells.

Figure 2B:
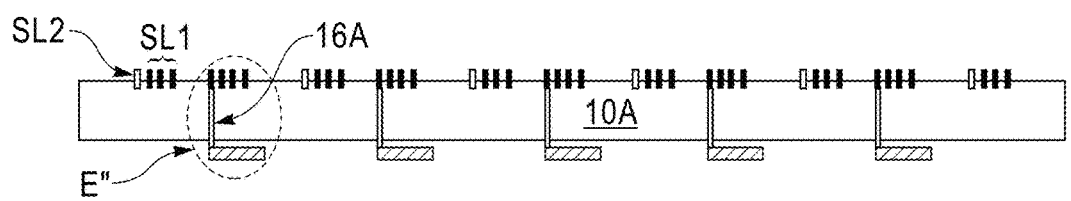
FIG. 2B is a cross sectional view though E-E' shown in FIG. 2A.

Referring now to FIG. 2B, this drawing illustrates that for every other (even column) microfluidic cell (going from left to right), the fourth probe electrode 16A accesses the microfluidic channel (not shown) via a through-via in the first substate 10A, and that each fourth probe electrode is electrically connected to a first single line of the first group of signal lines, SL1.

Figure 2C:
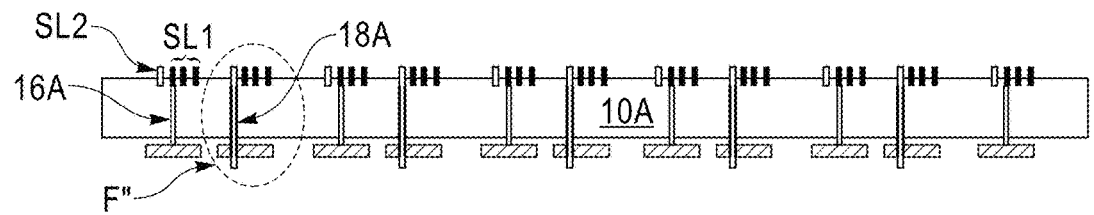
FIG. 2C is a cross sectional view though F-F' shown in FIG. 2A.

Referring now to FIG. 2C, this drawing illustrates that within every odd column of microfluidic cells, the fourth probe electrode 16A accesses the microfluidic channel (not shown) via a through-via in the first substrate 10A, and the each fourth probe electrode 16A is electrically connected to a second single line of the first group of signal lines, SL1, and for every even number column of microfluidic cells, the third probe electrode 18A accesses the microfluidic channel (not shown) via a through-via in the first substate 10A, and that each third probe electrode 18A is electrically connected to a first signal line of the second group of signal lines, SL2.

Figure 3A:
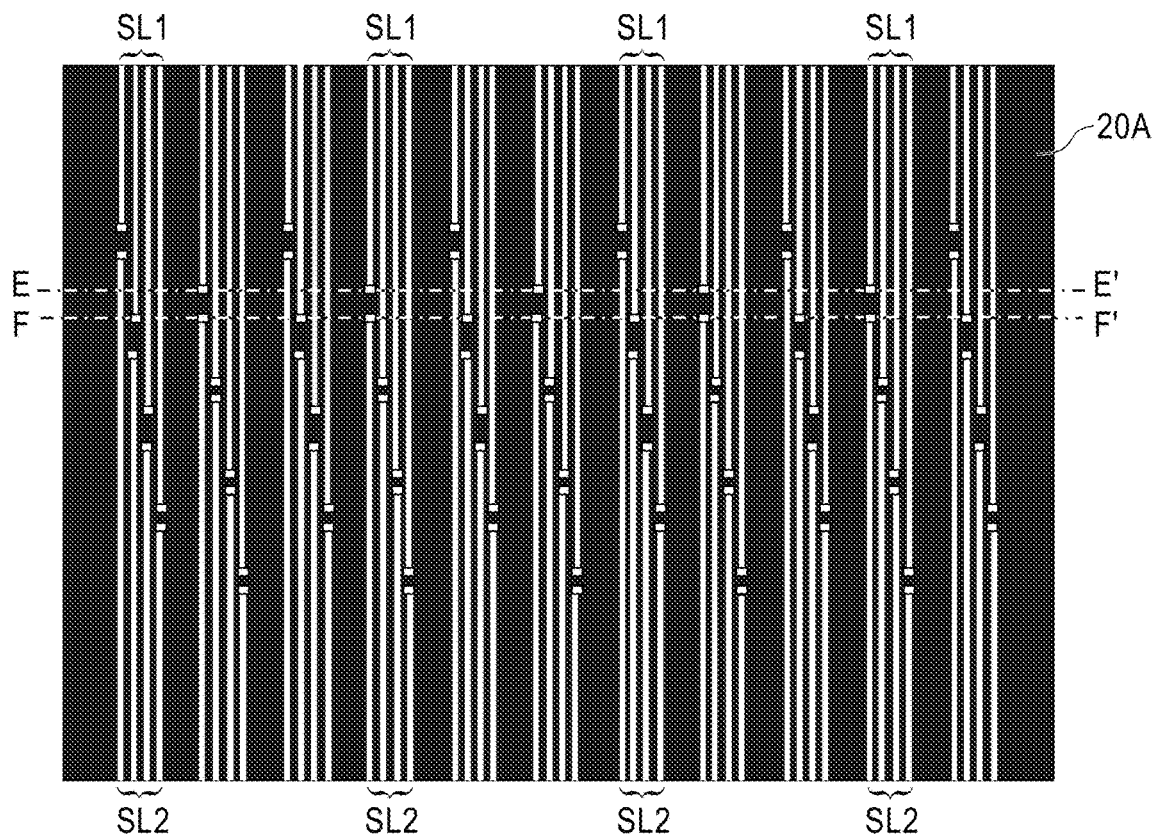
FIG. 3A is a top down view illustrating the 2D sensor array architecture for the first substrate shown in FIG. 2A containing in-line probe electrodes showing only the ground electrodes, cuts E-E' and F-F' are shown.
Figure 3B:
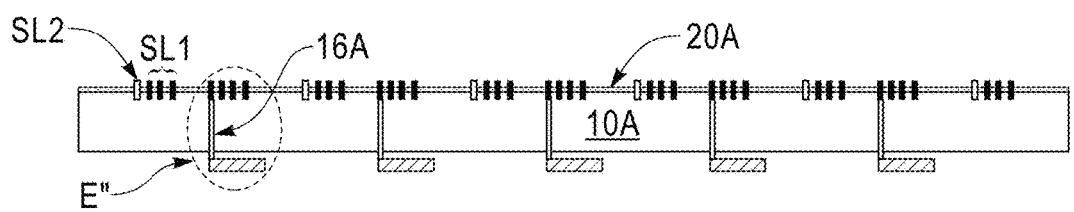
FIG. 3B is a cross sectional view though E-E' shown in FIG. 3A.
Figure 3C:
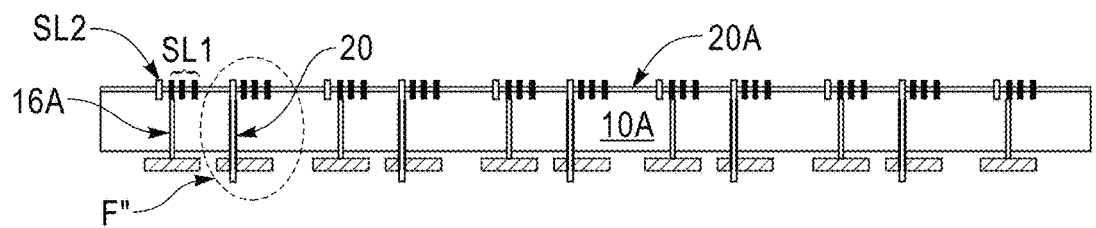
FIG. 3C is a cross sectional view though F-F' shown in FIG. 3A.

Referring now to FIG. 3A, there is illustrated the 2D sensor array architecture for the first substrate 10A shown in FIG. 2A containing in-line probe electrodes (not visible) showing only the ground electrodes 20A, cuts E-E' and F-F' are shown. FIG. 3B shows the same configuration as described above with respect to FIG. 2B except that the ground electrode 20A is shown. FIG. 3C shows the same configuration as described above with respect to FIG. 2C except that the ground electrode 20A is shown and that ground electrode 20A that accesses the microfluidic channel is coaxial with each third probe electrode 18A that accesses the microfluidic channel.

Figure 4A:
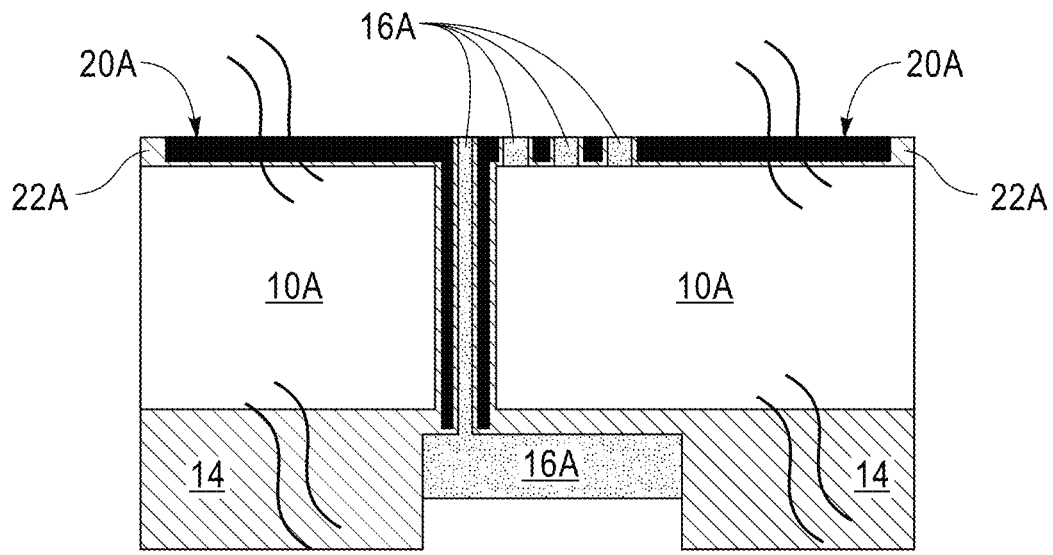
FIG. 4A is a cross sectional view of the first substrate after fabrication and before assembly at area E" shown in FIGS. 2B and 3B.
Figure 4B:
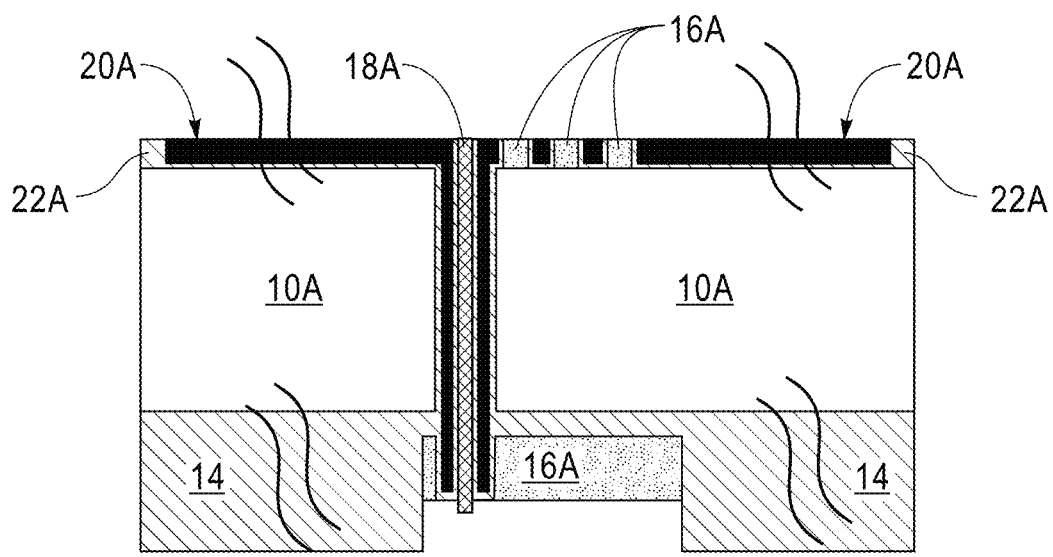
FIG. 4B is a cross sectional view of the first substrate after fabrication and before assembly at area F" shown in FIGS. 2C and 3C.

Referring now to FIGS. 4A-4B, there is illustrated the first substrate 10A after fabrication and before assembly at area E" shown in FIGS. 2B and 3B and at area F" shown in FIGS. 2C and 3C, respectively. Note the third probe 18A is designed to extend into the microfluidic channel upon assembly.

Figure 5A:
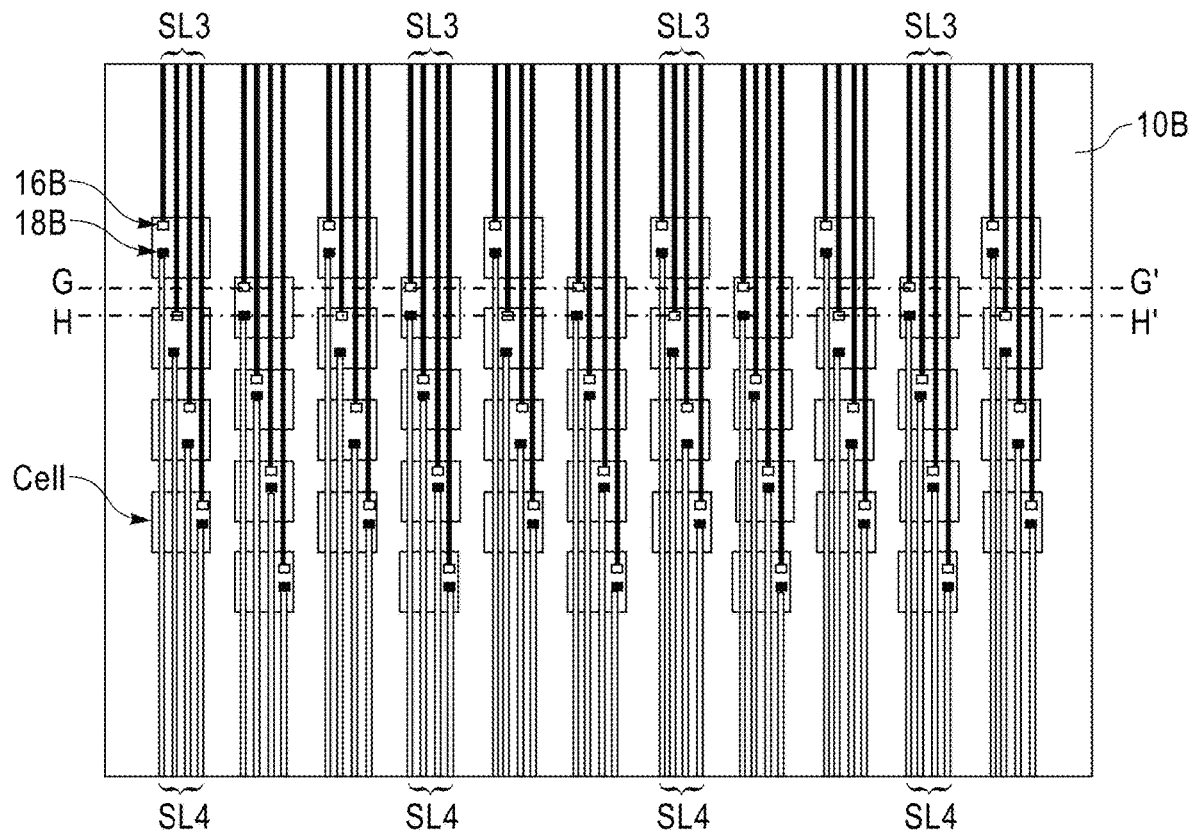
FIG. 5A is a top down view illustrating the 2D sensor array architecture for a second substrate containing in-line probe electrodes (the ground electrode is not shown) in accordance with an embodiment of the present application; cuts G-G' and H-H' are shown.

Referring now to FIG. 5A, there is illustrated the 2D sensor array architecture for a second substrate 10B containing in line probe electrodes (the ground electrode 20B is not shown) in accordance with an embodiment of the present application; cuts G-G' and H-H' are shown. Multiple microfluidic cells (one of which is shown in FIG. 1 by way of an example) are present in the illustrated embodiment. The multiple microfluidic cells are arranged in rows (left to right) and columns (top to bottom). The microfluidic cells in a given column are in-line with each other. Within each column of cells, a third group of four signal lines, SL3, is shown. Each individual signal line of the third group of signal lines, SL3, is electrically connected to a first probe electrode 16B that is present in each cell within a given column of cells. Within each column of cells, a fourth group of four signal lines, SL4, is shown. Each individual signal line of the fourth group of signal lines, SL4, is electrically connected to a second probe electrode 18B that is present in each cell within a given column of cells. FIG. 5A includes a cut G-G' which passes (from left to right) through alternative microfluidic cells and a cut H-H' that passes (from left to right) through each of microfluidic cells.

Figure 5B:
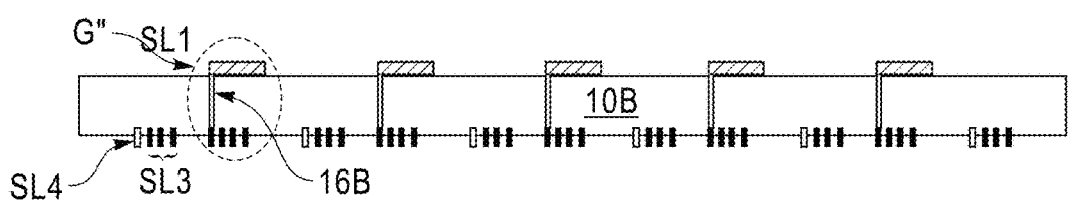
FIG. 5B is a cross sectional view though G-G' shown in FIG. 5A.

Referring now to FIG. 5B, this drawing illustrates that for every other (even column) microfluidic cell (going from left to right), the first probe electrode 16B accesses the microfluidic channel (not shown) via a through-via in the second substate 10B, and each first probe electrode 16B is electrically connected to a first single line of the third group of signal lines, SL3.

Figure 5C:
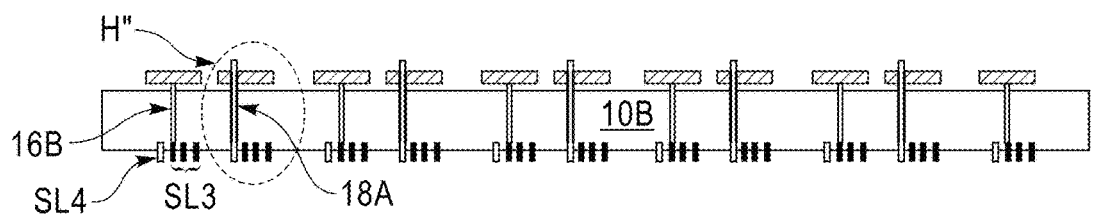
FIG. 5C is a cross sectional view though H-H' shown in FIG. 5A.

Referring now to FIG. 5C, this drawing illustrates that within every odd column of microfluidic cells, the first probe electrode 16B accesses the microfluidic channel (not shown) via a through-via in the second substate 10B, and the each first probe electrode 16B is electrically connected to a second single line of the third group of signal lines, SL3, and for every even number column of microfluidic cells, the second probe electrode 18B accesses the microfluidic channel (not shown) via a through-via in the second substate 10B, and the each second probe electrode 18B is electrically connected to a first signal line of the fourth group of signal lines, SL4.

Figure 6A:
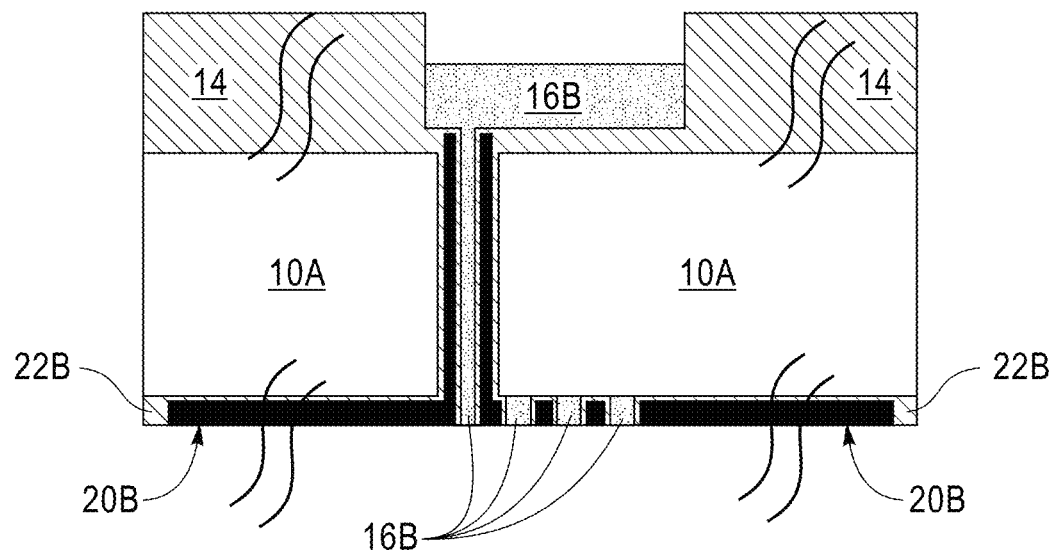
FIG. 6A is a cross sectional view of the second substrate after fabrication and before assembly at area G" shown in FIG. 5B.
Figure 6B:
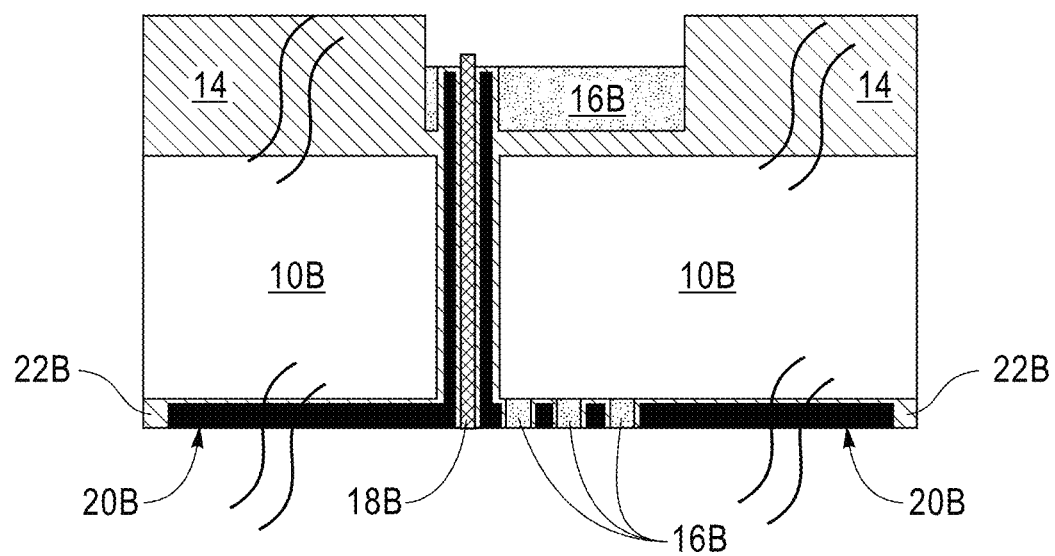
FIG. 6B is a cross sectional view of the second substrate after fabrication and before assembly at area H" shown in FIG. 5C.

Referring now to FIGS. 6A-6B, there are illustrated the second substrate 10B after fabrication and before assembly at area G" shown in FIG. 5B, and at area H" shown in FIG. 5C, respectively. The ground electrode 20B is shown in each of FIGS. 6A and 6B. Note the second probe 18B is designed to extend into the microfluidic channel upon assembly.

Figure 7A:
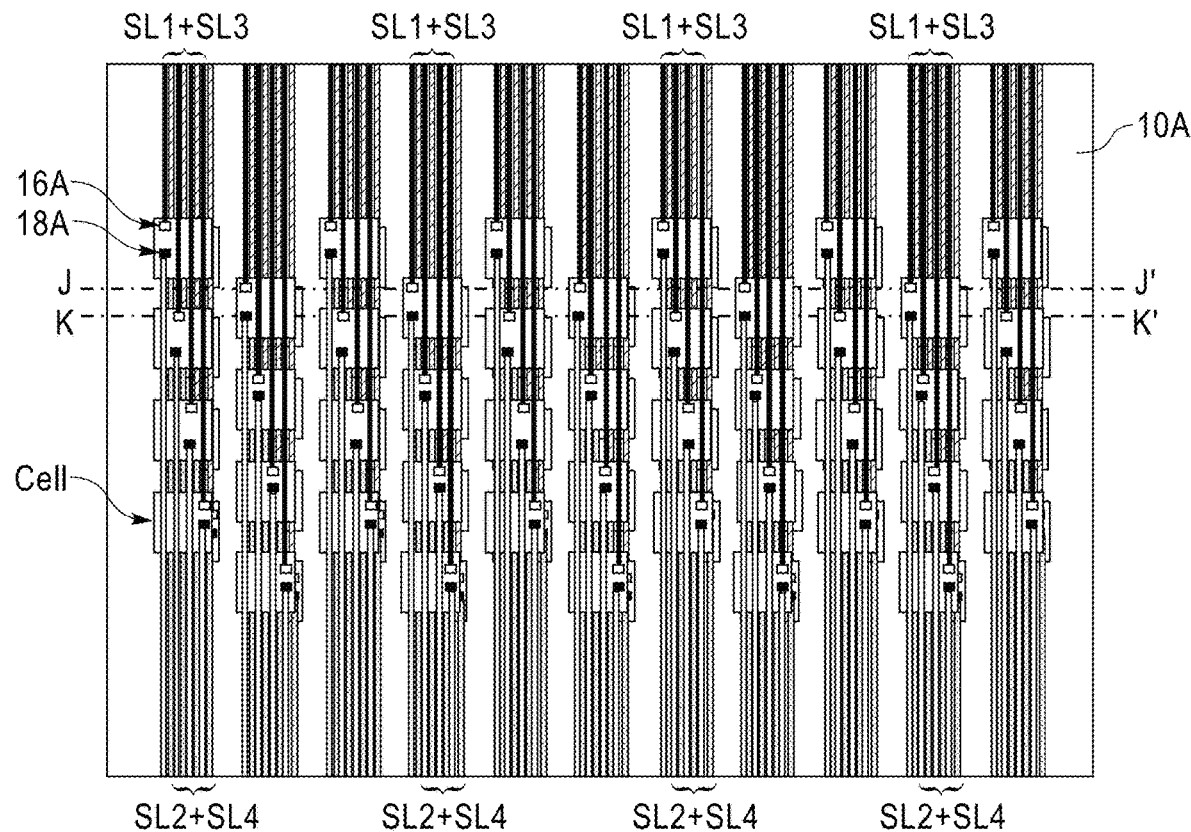
FIG. 7A is a top down view of the combination of 2D sensor array architecture shown in FIGS. 2A and 5A, cuts J-J' and K-K' are shown; note the ground electrodes are not shown.
Figure 7B:
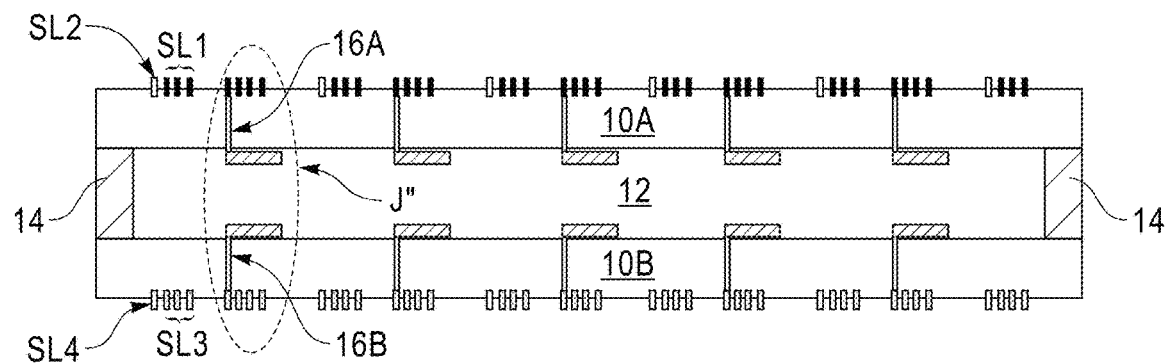
FIG. 7B is a cross sectional view through J-J' shown in FIG. 7A.
Figure 7C:
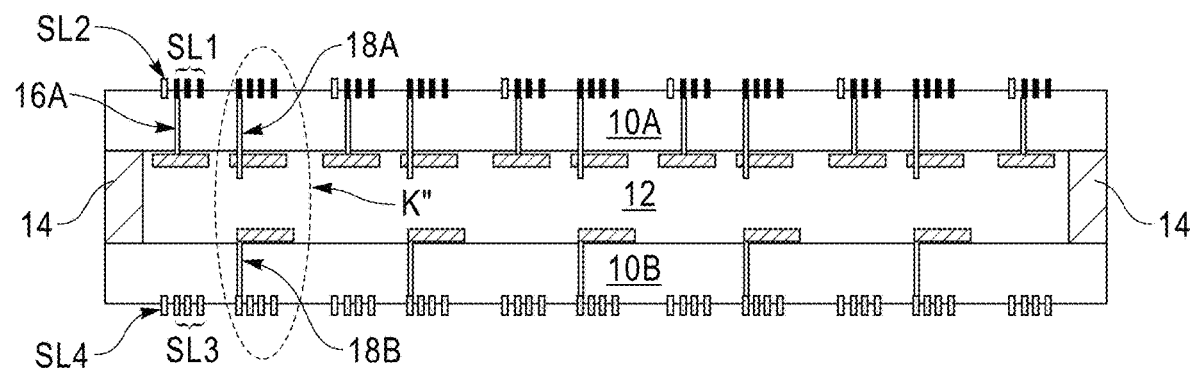
FIG. 7C is a cross sectional view through K'-K" shown in FIG. 7A.
Figure 7D:
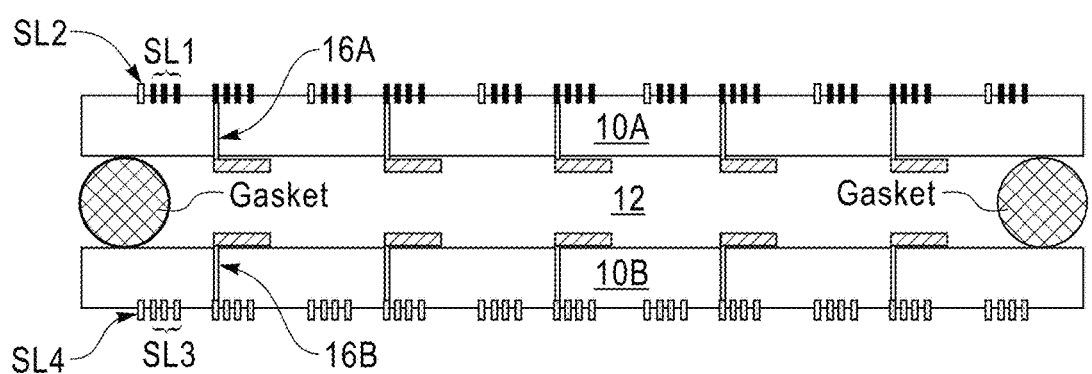
FIG. 7D is a cross sectional view through J-J' shown in FIG. 7A using a gasket to separate the first and second substrates.

Referring now to FIG. 7A, there is illustrated the combination of 2D sensor array architecture shown in FIGS. 2A and 5A, cuts J-J' and K-K' are shown; note the ground electrodes are not shown. FIG. 7B is a cross sectional view through J-J' shown in FIG. 7A, while FIG. 7C is a cross sectional view through K'-K" shown in FIG. 7A, and FIG. 7D is a cross sectional view through J-J' shown in FIG. 7A using a gasket to separate the first and second substrates 10A, 10B.

Figure 8A:
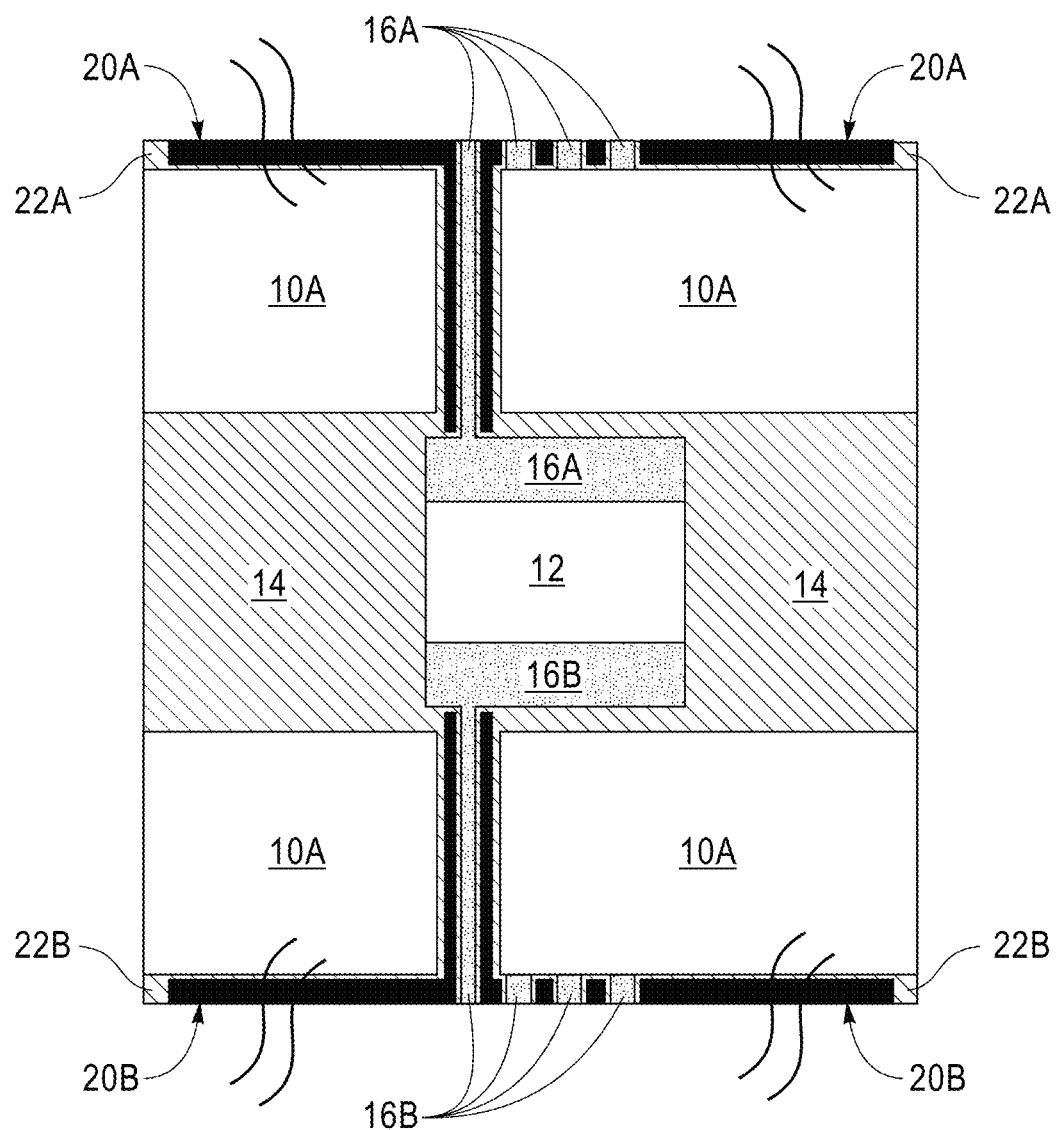
FIG. 8A is cross sectional view of the combination of 2D sensor array architecture shown in FIG. 7A and at area J"' illustrated in FIG. 7B.

Referring now to FIGS. 8A, this drawing shows the region of the structure that includes the fourth probe electrode 16A and the first probe electrode 16B.

Figure 8B:
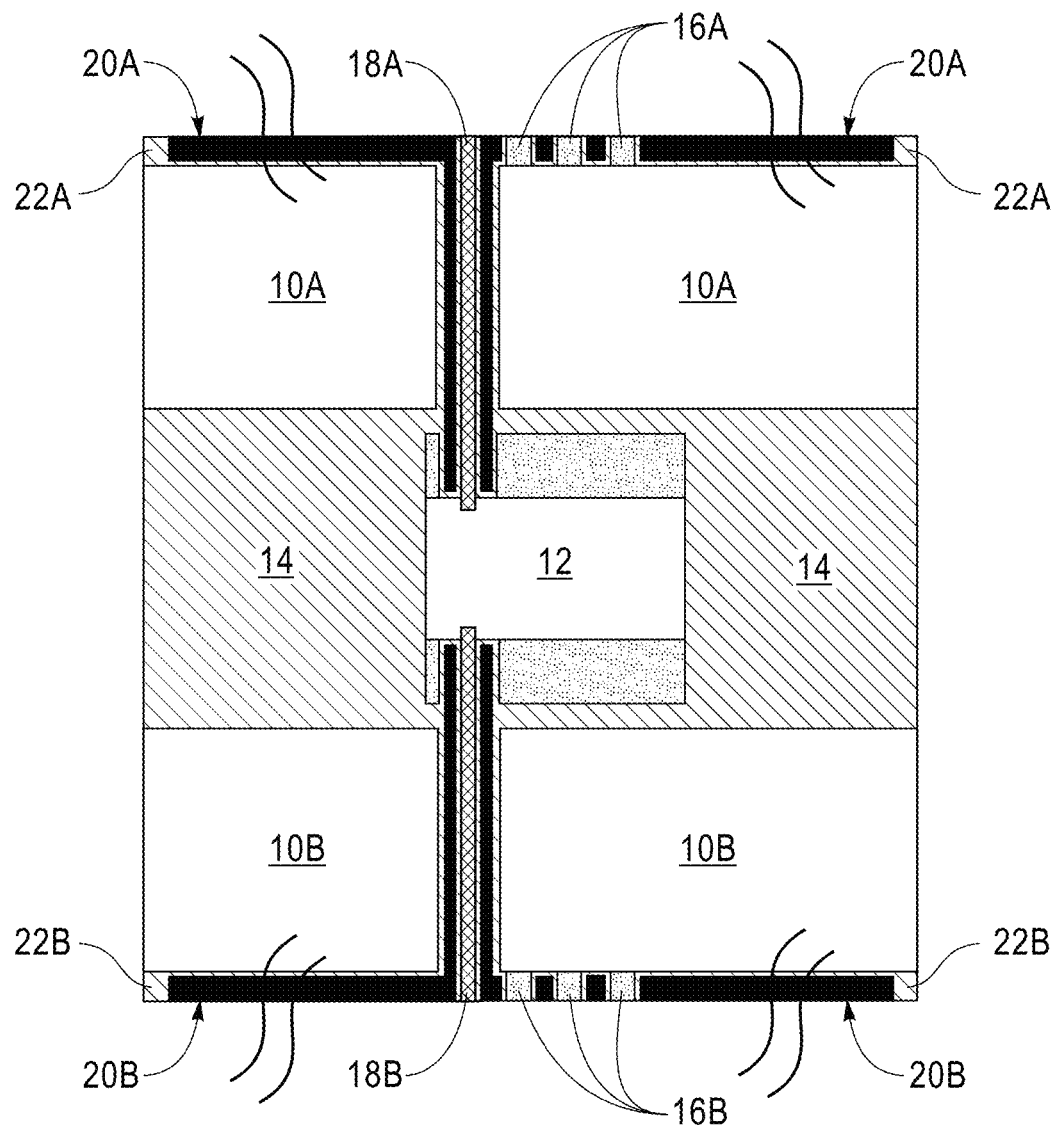
FIG. 8B is cross sectional view of the combination of 2D sensor array architecture shown in FIG. 7A and at area J"' illustrated in FIG. 7C.

Referring now to FIG. 8B, this drawing shows the region of the structure that includes the third probe electrode 18A and the second probe electrode 16A.

Figure 9A:
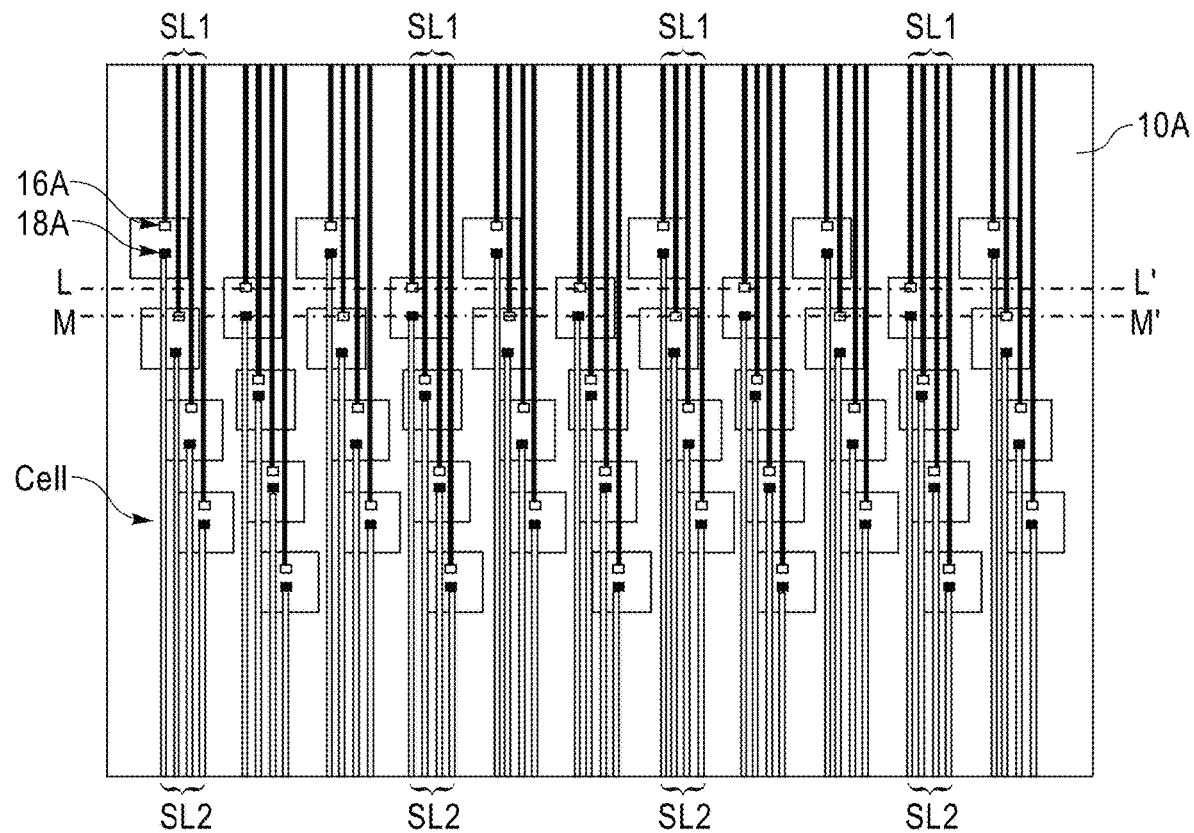
FIG. 9A is a top down view illustrating a 2D sensor array architecture for a first substrate containing staggered probe electrodes (the ground electrode is not shown) in accordance with an embodiment of the present application; cuts L-L' and M-M' are shown.

Referring now to FIG. 9A, there is illustrated a 2D sensor array architecture for a first substrate 10A containing staggered probe electrodes (the ground electrode 20A is not shown) in accordance with an embodiment of the present application; cuts L-L' and M-M' are shown. Multiple microfluidic cells (one of which is shown in FIG. 1 by way of an example) are present in the illustrated embodiment. The multiple microfluidic cells are arranged in rows (left to right) and columns (top to bottom). The microfluidic cells in a given column are staggered relative to each other. Within each column of cells, a first group of four signal lines, SL1, is shown. Each individual signal line of the first group of signal lines, SL1, is electrically connected to a fourth probe electrode 16A that is present in each cell within a given column of cells. Within each column of cells, a second group of four signal lines, SL2, is shown. Each individual signal line of the second group of signal lines, SL2, is electrically connected to a third probe electrode 18A that is present in each cell within a given column of cells. FIG. 9A includes a cut L-L' which passes (from left to right) through alternative microfluidic cells and a cut M-M' that passes (from left to right) through each of microfluidic cells.

Figure 9B:
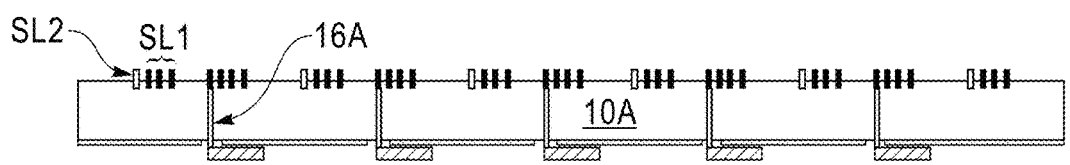
FIG. 9B is a cross sectional view though L-L' shown in FIG. 9A.

Referring now to FIG. 9B, this drawing illustrates that for every other (even column) microfluidic cell (going from left to right), the fourth probe electrode 16A accesses the microfluidic channel (not shown) via a through-via in the first substate 10A, and that each fourth probe electrode is electrically connected to a first single line of the first group of signal lines, SL1.

Figure 9C:
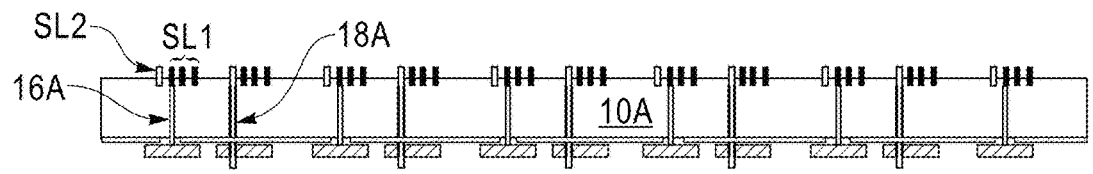
FIG. 9C is a cross sectional view though M-M' shown in FIG. 9A.

Referring now to FIG. 9C, this drawing illustrates that within every odd column of microfluidic cells, the fourth probe electrode 16A accesses the microfluidic channel (not shown) via a through-via in the first substate 10A, and the each fourth probe electrode 16A is electrically connected to a second single line of the first group of signal lines, SL1, and for every even number column of microfluidic cells, the third probe electrode 18A accesses the microfluidic channel (not shown) via a through-via in the first substate 10A, and the each third probe electrode 18A is electrically connected to a first signal line of the second group of signal lines, SL2.

Figure 10A:
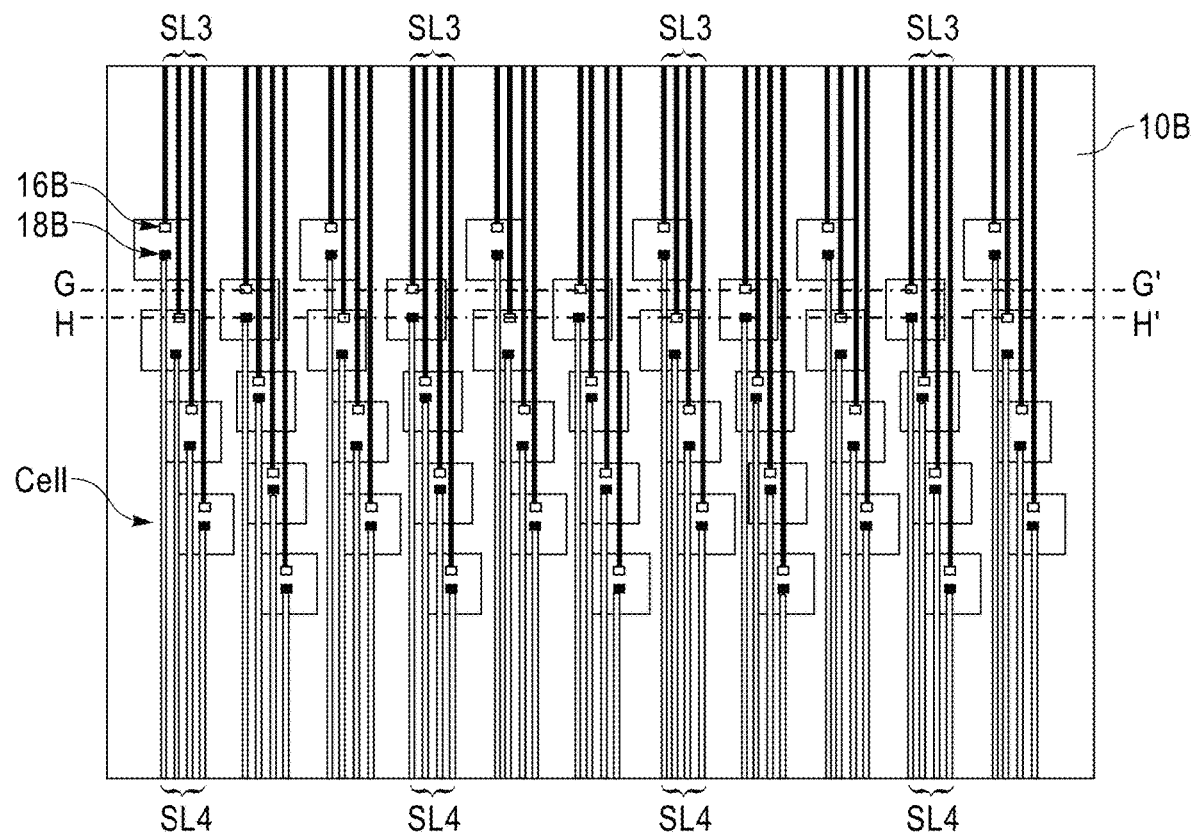
FIG. 10A is a top down view illustrating a 2D sensor array architecture for a second substrate containing staggered probe electrodes (the ground electrode is not shown) in accordance with an embodiment of the present application; cuts N-N' and P-P' are shown.

Referring now to FIG. 10A, there is illustrated a 2D sensor array architecture for a second substrate 10B containing staggered probe electrodes (the ground electrode 20B is not shown) in accordance with an embodiment of the present application; cuts N-N' and P-P' are shown. The multiple microfluidic cells are arranged in rows (left to right) and columns (top to bottom). The microfluidic cells in a given column are staggered relative to each other. Within each column of cells, a third group of four signal lines, SL3, is shown. Each individual signal line of the third group of signal lines, SL3, is electrically connected to a first probe electrode 16B that is present in each cell within a given column of cells. Within each column of cells, a fourth group of four signal lines, SL4, is shown. Each individual signal line of the fourth group of signal lines, SL4, is electrically connected to a second probe electrode 18B that is present in each cell within a given column of cells. FIG. 10A includes a cut N-N' which passes (from left to right) through alternative microfluidic cells and a cut P-P' that passes (from left to right) through each of microfluidic cells.

Figure 10B:
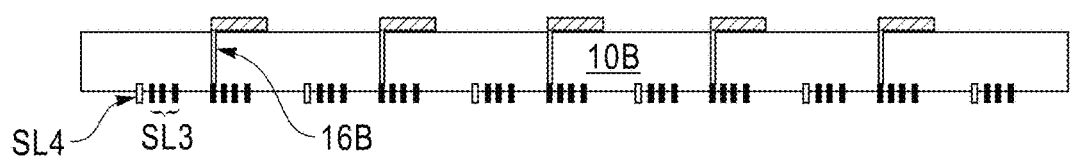
FIG. 10B is a cross sectional view though N-N' shown in FIG. 10A.

Referring now to FIG. 10B, this drawing illustrates that for every other (even column) microfluidic cell (going from left to right), the first probe electrode 16B accesses the microfluidic channel (not shown) via a through-via in the second substate 10B, and that each first probe electrode 16B is electrically connected to a first single line of the third group of signal lines, SL3.

Figure 10C:
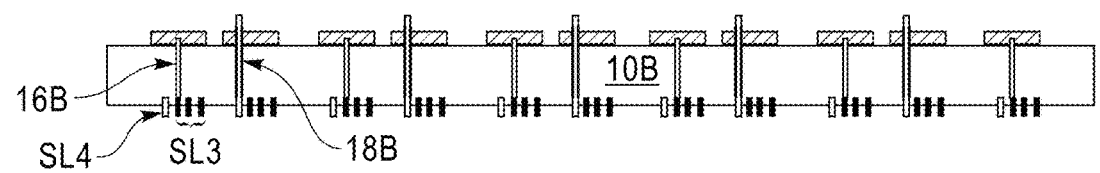
FIG. 10C is a cross sectional view though P-P' shown in FIG. 10A.

Referring now to FIG. 10C, this drawing illustrates that within every odd column of microfluidic cells, the first probe electrode 16B accesses the microfluidic channel (not shown) via a through-via in the second substate 10B, and the each first probe electrode 16B is electrically connected to a second single line of the third group of signal lines, SL3, and for every even number column of microfluidic cells, the second probe electrode 18B accesses the microfluidic channel (not shown) via a through-via in the second substate 10B, and the each second probe electrode 18B is electrically connected to a first signal line of the fourth group of signal lines, SL4.

Figure 11A:
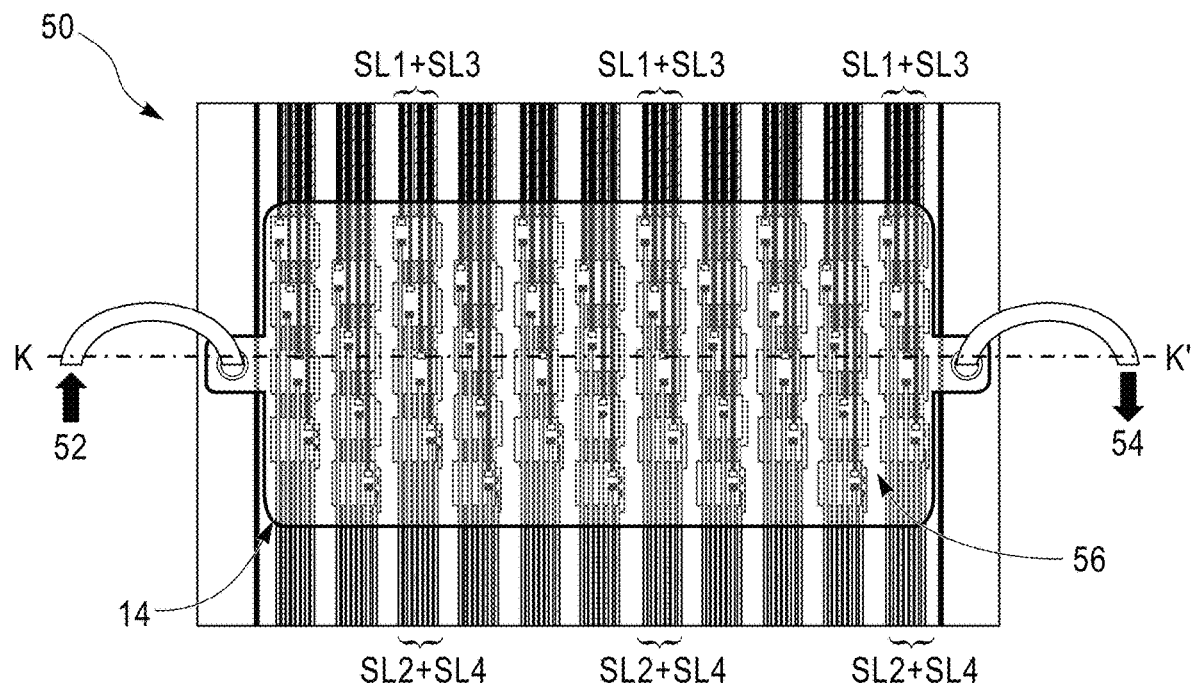
FIG. 11A is a top down view of 2D microfluidic structure of the present application with fluidic ports in accordance with an embodiment of the present application, cut K-K' is shown.
Figure 11C:
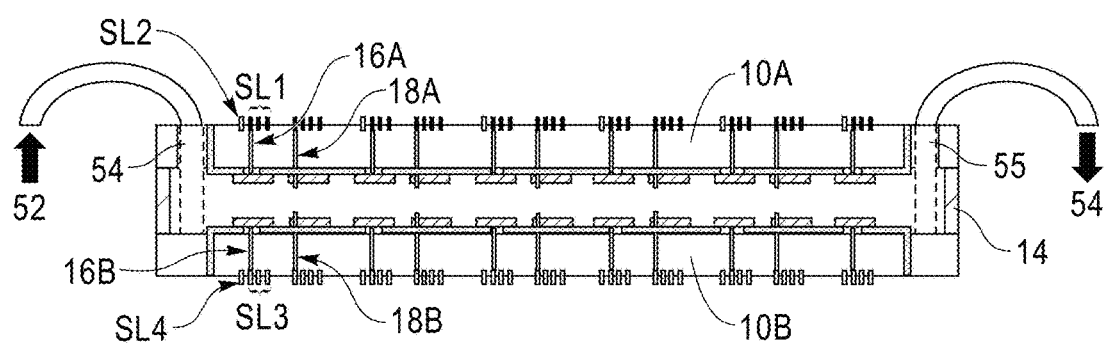
FIG. 11B is a cross sectional view though K-K' shown in FIG. 11A.

Referring now to FIG. 11A, there is illustrated 2D microfluidic structure 50 with fluidic ports 52, 54 in accordance with an embodiment of the present application, cut K-K' is shown. FIG. 11B is a cross sectional view though K-K' shown in FIG. 11A. Notably, FIG. 11A illustrates 2D microfluidic structure 50 that is similar to the 2D microstructure structure shown in FIG. 7A. The illustrated structure in FIG. 11A further includes fluidic inlet port 52 in which a liquid or a gas (or other like sample) containing one or more substances to be detected is introduced into the 2D microstructure structure, fluidic outlet port 54 in which the liquid or gas containing the one or more substances exits the 2D microfluidic structure 50, and a fluidic chamber 56 that is located between the fluidic inlet port 52 and the fluidic outlet port 54. The outlet port 54 can be connected to a vacuum to facilitate the withdraw of the exiting liquid or gas containing the one or more substances. As shown in FIG. 11B, the fluidic inlet port 52 is connected to a first though hole 54 in the first substrate 10 and this first though hole 54 is connecting to a first end of the fluidic channel 12 of the 2D microfluidic structure 50. As further shown in FIG. 11B, the fluidic outlet port 54 is connected to a second though hole 55 in the first substrate 10 and this second though hole 55 is connecting a second end of the fluidic channel 12 of the 2D microfluidic structure 50.

The embodiment shown in FIGS. 11A-11B represents one way of introducing a microfluidic liquid or gas into the 2D microfluidic structure 50 of the present application. Other means for introducing a microfluidic liquid or gas into the 2D microfluidic structure 50 of the present application are contemplated. For example, a plurality of fluidic inlet ports and fluidic outlet ports can be used. In such an embodiment, the plurality of fluidic inlet ports can be merged, unmerged or a first set of fluidic inlet ports can be merged and a second set of fluidic inlet ports can be unmerged. Also, and such an embodiment, the plurality of fluidic outlet ports can be merged, unmerged or a first set of fluidic outlet ports can be merged and a second set of fluidic outlet ports can be unmerged.

Figure 12:
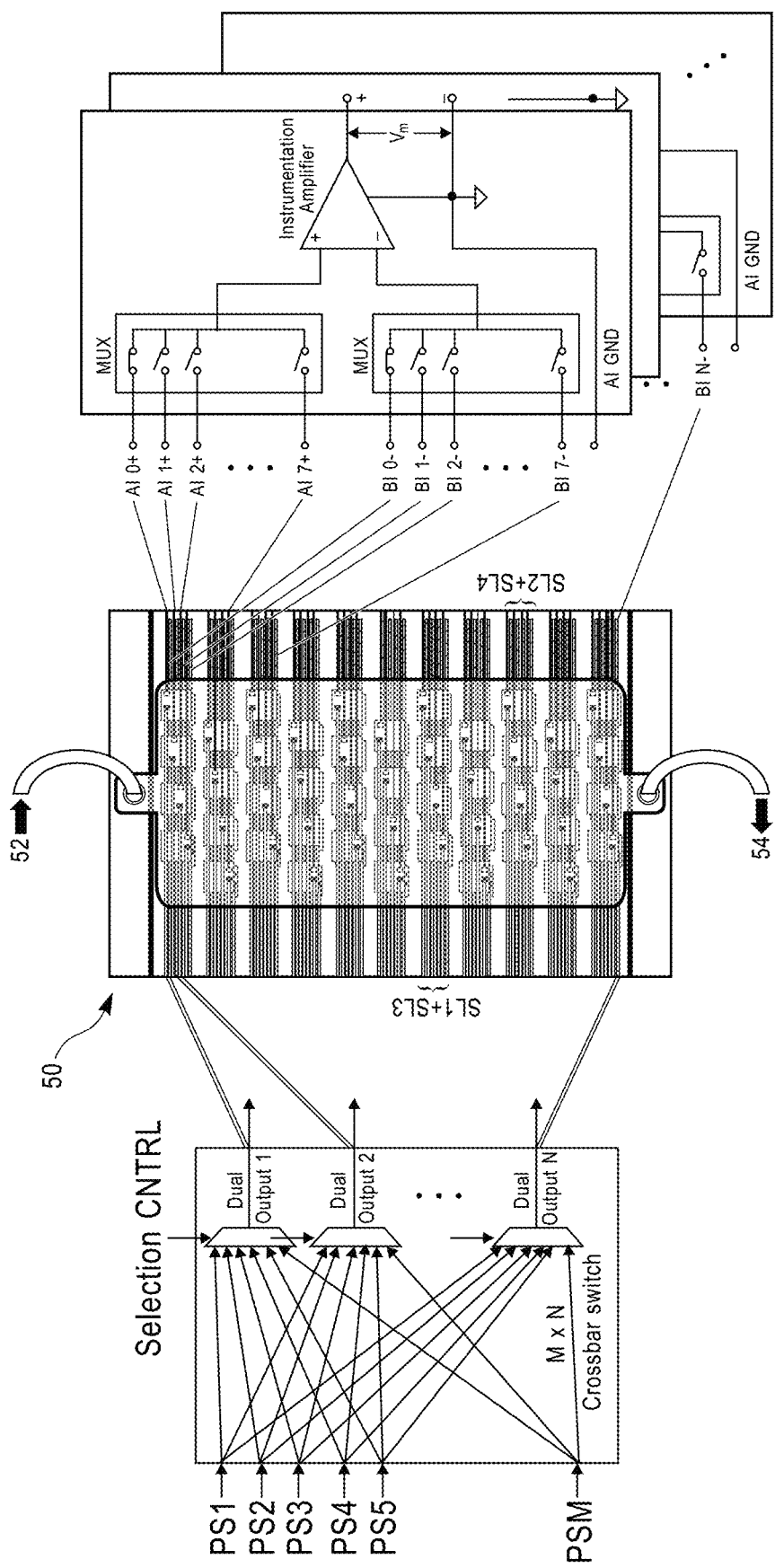
FIG. 12 is a schematic drawing showing an integrated sensor array circuit that can be employed in accordance with an embodiment of the present application.
Figure 12:
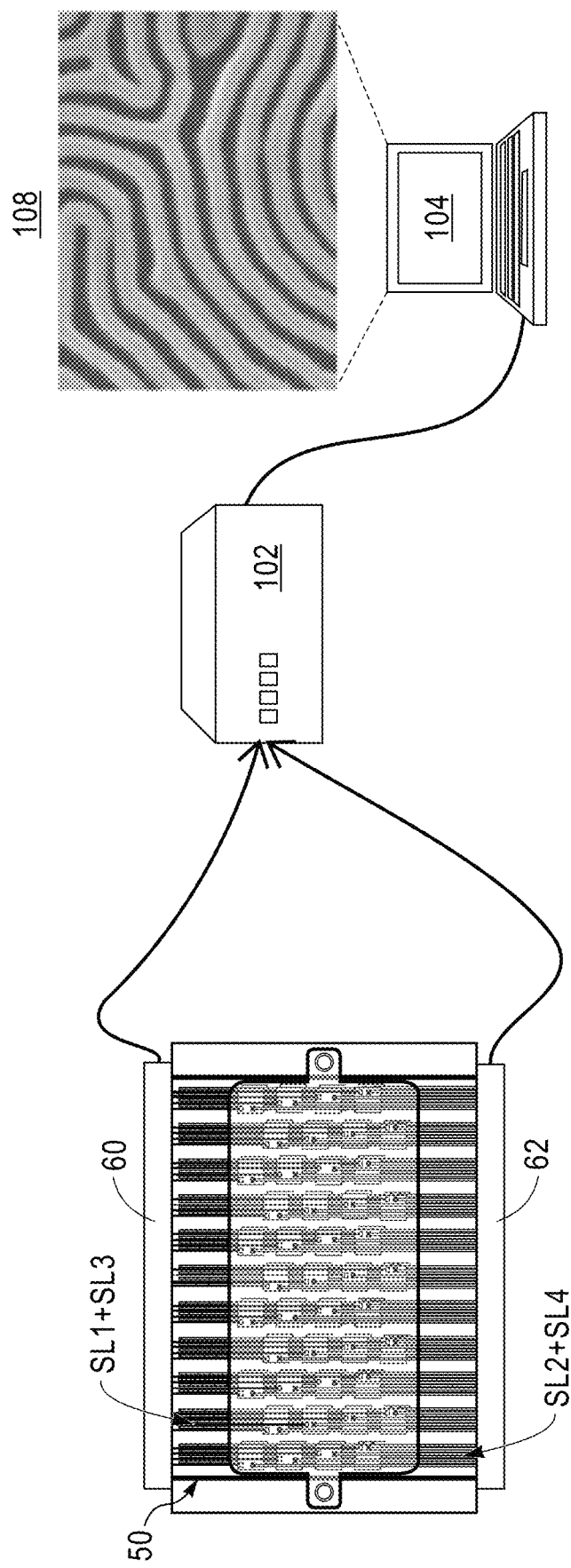

Referring now to FIG. 12, there is illustrated an integrated sensor array circuit that can be employed in accordance with an embodiment of the present application. Notably, FIG. 12 illustrates an integrated sensing circuit 62 that is electrically connected to SL2 and SL4 signal lines, and integrated reconfigurable crossbar switch 60 that is electrically connected to SL1 and SL3 signal lines.

The integrated reconfigurable crossbar switch 60 enables differential supply selection for individual sensing elements versus time. It can also be used as a current or voltage supply. In one embodiment, the integrated reconfigurable crossbar switch 60 can include a data selector, known more commonly as a multiplexer or "Mux" for short. The Mux selects between several analog or digital input signals and forwards the selected input to a single output line. The selection is directed by a separate set of digital inputs known as select lines. The multiplexer of inputs has select lines, which are used to select which input line to send to the output. A multiplexer makes it possible for several input signals to share one device or resource, for example, one analog-to-digital converter or one communications transmission medium, instead of having one device per input signal. The crossbar switch 60 shown as an example contains one or more power supplies labeled in FIG. 12 as PS1, PS2, PS3, etc. to PSM. The power supplies PS1, PS2, PS3, etc. to PSM may supply a DC voltage or an AC voltage. The DC voltage can have a range of 0V, or ground, to 100V or more, but typically ground and 1 mV to 20V and usually proportional to the microfluidic channel 12 height. The AC voltage can consist of sinusoidal, trapezoidal, square waveforms, ramps, etc. shape pulses of different frequencies from very low frequencies of 1 mHz or lower to 1 GHz or higher, and with a duty cycle ranging from 0.001% to 99.99%, but typically 10% to 50%. The DC voltages can be negative, positive or ground. The AC voltages and be negative. positive or both within the shape pulses. The selection CNTRL will select one or more power supplies PS1, PS2, PS3, etc. to PSM from the input side of the crossbar switch 60 to the output side of the crossbar switch 60, which is labeled Output 1, Output 2, etc., to Output N. FIG. 12 shows one implementation of the Output 1, Output 2, etc., to Output N where each output is a dual output connected to one SL1 line and one SL3 line. Note that the Selector CNTRL provides the greatest flexibility of having different power supplies PS1, PS2, PS3, etc., to PSM connected uniquely to Output 1, Output 2, etc., to Output N. Overall, the crossbar switch 60 shown has external ports of M inputs, PS1, PS2, PS3, etc. to PSM, and N dual outputs, Output 1, Output 2, etc. to Output n, with a Selection CNTRL In one embodiment of the present application, the integrated sensing circuit 62 can include a data distributor, known more commonly as a demultiplexer or "Demux" for short. The Demux can include any one of a number of individual input lines one at a time and switches it to one single output line. The Demux converts a serial data signal at the input to a parallel data at is output. Integrating sensing circuit 62 also contains one or more measurement instrumentation amplifiers. The close proximity of the integrating sensing circuit 62 to the microfluidic structure 50 ensures the best signal-to-noise ratio present on SL2 and SL4. Within the integrating sensing circuit 62, the co-packaging in close proximity of the Demux circuit with the instrumentation amplifier further improves the signal-to-noise ratio of SL2 and SL4. To further the best signal-to-noise ratio, the instrumentation amplifier has differential inputs, + and −, which are connected to a Demux determined SL4 and SL2 line pair. The Demux module shown as an example is a dual 8:1

Demux, where eight SL4 lines and eight SL2 lines from microfluidic structure 50 are eight inputs AI-0, AI-1, etc. to AI-7 and eight inputs NI-0, BI-1, etc. to BI-7, respectively, to the dual Demux. The Dual Demux module then selects one SL2 line and one SL4 line as inputs to the positive (+) and negative (−) Instrumentation Amplifier inputs, respectively. The instrumentation amplifier can be in a differential amp, current amp, voltage amp, etc. configuration. As an example, the Dual Demux module has two outputs, a positive (+) and a negative (−) with a voltage difference of Vm. At any given instance in time, the voltage difference Vm is proportional to the signal sensed in a given microfluidic cell between probes 2and 3 via electrodes 18B and 18A, respectively. The AI GND input can be common to the 2D microfluidic structure 50 ground electrode (i.e., shield) 20A, and the negative (−) output of the integrating sensing circuit 62. Shown are multiple dual Demux modules that provide a total of N dual inputs that make up the integrating sensing circuit 62. The integrated sensing circuit 62 is typically bonded to the 2D microfluidic structure 50 to improve the S/N ratio, reduce I/O and reduce overall circuitry.

Referring now to FIG. 13, there is illustrated an integrated microfluidic sensing system that can be employed in accordance with an embodiment of the present application. The integrated microfluidic sensing system illustrated in FIG. 13 includes a 2D microfluidic structure 50 in accordance with the present application that includes integrated reconfigurable crossbar switch 60 as defined above, and an integrated reconfigurable crossbar switch 60 as defined above. Integrated sensing circuit 62 is electrically connected to SL2 and SL4 signal lines, and integrated reconfigurable crossbar switch 60 is electrically connected to SL1 and SL3 signal lines. As shown, each of the reconfigurable crossbar switch 60 and the integrated sensing circuit 62 is electrically connected to a data acquisition device 102 such as, for example, a computer. The data acquisition device 102 is further wired to a data monitor 104 such as, for example, a computer screen where the acquired data 108 can be viewed.

There are various measurement and measurement hooks possible with the integrated circuit 62. In some embodiments, the instrument circuit can be a capacitance sensing amp for either (1) AC or DC differential sensing, or (2) a two (+/−) lead or a three lead (+/−/ground) hook-up. In other embodiments, the instrument circuit can be a current or voltage amp for either (1) quasi-static or AC capacitance measurements, (2) resistive measures or (3) AC impedance measurements.

The one or more substances that can be sensed using the 2D microfluidic structure of the present application can be referred to as an analyte. As used herein, the term "analyte" or "analytes" is any biomolecule that can be recognized. In some embodiments, an analyte is a polypeptide. As used herein, a "polypeptide" is a single polymer chain of amino acids bonded together by peptide bonds between the carboxyl and amino groups of adjacent amino acid residues. The term "protein" includes polypeptide. The term "protein" may also be used to describe a polypeptide, having multiple domains, such as beta sheets, linkers and alpha-helices. As such, the term "protein" is also meant to include polypeptides having quaternary structures, ternary structures and other complex macromolecules composed of at least one polypeptide. If the protein is comprised of more than one polypeptide that physically associate with one another, then the term "protein" as used herein refers to the multiple polypeptides that are physically coupled and function together as the discrete unit.

In embodiments of the present application, an analyte is any polypeptide that includes an epitope or amino acid sequence of interest. Such polypeptide can be isolated from cells, synthetically produced, or recombinantly produced using means known by those of ordinary skill in the art. In some embodiments, an analyte is any polypeptide that includes an epitope or amino acid sequence of interest. In certain embodiments, polypeptide (protein) analytes can be isolated from cells or viruses, synthetically produced, or recombinantly produced. In one embodiment, an analyte is a protein or a fragment thereof that has been produced by a cell or virus. In certain embodiments, the analyte is a protein that is present on the outermost surface of the cellular membrane or viral capsid. In one embodiment, the protein present on the outermost surface of the cellular membrane or viral capsid has an antigen or epitope that is accessible to a label (e.g., antibody, dye). In yet other embodiments, an analyte is a protein or a fragment thereof that has been secreted by a cell.

In certain exemplary embodiments, an analyte is hemagglutinin present on a surface of an influenza virus, a derivative, analog or homolog thereof. In other exemplary embodiments, an analyte is a cell surface protein known by those of ordinary skill in the art. In other embodiments, the analyte is a nucleic acid. The nucleic acid analyte can be a deoxyribonucleic acid (DNA), e.g., genomic DNA or isolating coding DNA. In other embodiments, the nucleic acid analyte can be a ribonucleic acid (RNA), such as messenger RNA, ribosomal RNA molecule. The nucleic acid analyte can be single stranded or double stranded.

In certain embodiments, the analyte of interest can be affixed (bound) to a detectable label. The term "label" or "detectable label" as used herein means a molecule, such as a dye, nanoparticle, oligonucleotide, or an antibody that is capable of binding to an analyte of interest when contacted by the analyte. A label may be directly detectable (e.g., fluorescent moieties, electrochemical labels, electrochemical luminescence labels, metal chelates, colloidal metal particles, quantum dots), as well as a molecule or molecules that may be indirectly detected by production of a detectable reaction product (e.g., enzymes such as horseradish peroxidase, alkaline phosphatase and the like), a molecule or molecules that can be detected by recognition of a molecule that specifically binds to the detection antibody such as, a labeled antibody that binds to the detection antibody, biotin, digoxigenin, maltose, oligohistidine, 2,4-dintrobenzene, phenylarsenate, a nucleic acid (e.g., ssDNA, dsDNA) or the like).

Labels for use in the present application can be provided on the surface of the probe electrodes that extend into the microfluidic channel 12 (e.g., third probe electrode 18A and second probe electrode 18B) or a label can be provided to a sample prior to introduction to a micro-capacitive sensor array of the present application. In certain embodiments, the label is affixed to the probe electrodes that extend into the microfluidic channel 12 (e.g., third probe electrode 18A and second probe electrode 18B) such that a binding portion (e.g., antigen-binding portion of an antibody) of the label is positioned such that the binding portion can be contacted by the portion of the analyte to which it binds (e.g., antigen) when presented thereto. In other instances, the probe electrodes that extend into the microfluidic channel 12 (e.g., third probe electrode 18A and second probe electrode 18B) can be coated with a label, which when contacted with an analyte removes the label from the structure.

A "sample" or a portion thereof is provided to 2D microfluidic structure of the present application; the sample can be a liquid or gas. The sample contains at least one analyte (i.e., substance) of interest, such as a protein or nucleic acid. Regardless of the number of analytes or analytes of interest, the sample can be readily applied to a micro-capacitive sensor array of the present application. In certain embodiments, a sample may be obtained from a subject, or may be obtained from other materials. The term "subject" as used herein refers to a human or non-human organism. Further, while a subject is preferably a living organism, the subject can also be in post-mortem analysis as well. Subjects that are humans can be "patients," which as used herein refers to living humans that are receiving or may receive medical care for a disease or condition.

In some instances, the sample is created for the purpose of determining the presence of certain analytes therein. For example, a sample may be obtained from cell culture, a fluid or tissue known to include, or not include the analyte(s) of interest. In other instances, the sample is created by adding synthetic or recombinantly produced peptides to a solution that is easily stored and dispensed. In specific embodiments, samples for use in the present methods are body fluid samples obtained from a subject, such as a patient. In some embodiments, samples of the present disclosure include blood, tears serum, plasma, cerebrospinal fluid, urine, saliva, sputum, and pleural effusions. One of skill in the art would realize that certain samples would be more readily analyzed following processing, e.g., fractionation or purification. For example, fractionation of whole blood obtained from a subject into serum and/or plasma components. Hence, a sample can be used as is, or can be treated to result in a final sample for detection of analytes. For example, a sample can be liquefied, concentrated, dried, diluted, lyophilized, extracted, fractionated, subjected to chromatography, purified, acidified, reduced, degraded, subjected to enzymatic treatment, or otherwise treated in ways known to those having ordinary skill in the art in order to release an analyte of interest. If desired, a sample can be a combination (pool) of samples, e.g., from an individual or from a manufacturing process.

A sample can be in a variety of physical states, such as liquid, solid, emulsion, or gel. Samples can be treated with customary care to preserve analyte integrity. Treatment can include the use of appropriate buffers and/or inhibitors, such as inhibitors of certain biological enzymes. One having ordinary skill in the art will be able to determine the appropriate conditions given the analytes of interest and the nature of the sample.

For example, the sample may be liquid and the amount of a liquid sample provided to a micro-capacitive sensor array of the present application can be from 1-100 mL, 1-50 mL, 1-40 mL, 1-30 mL, 1-20 mL, 1-10 mL, 1-5 mL, 1-4 mL, 1-3 mL, 1-2 mL or less than 2 mL of sample. In some embodiments, the amount of liquid sample is from 1-100 µL, 1-50 µL, 1-40 µL, 1-30 µL, 1-20 µL, 1-10 µL, 1-5 µL or less of sample.

In embodiments, the capacitance change across the microfluidic channel 12 can be monitored. By recording the capacitance of a pair of probe electrodes over time, a 2D map of the capacitance of the entire sensor array can be generated. Any capacitance change between electrode probe pairs can be analyzed for Brownian motion to determine the diffusion constant of the analyte of interest to identify the presence of the analyte in the sample. In some embodiments, the dielectric constant of an analyst over time can be determined utilizing the 2D microfluidic structure of the present application.

While the present application has been particularly shown and described with respect to preferred embodiments thereof, it will be understood by those skilled in the art that the foregoing and other changes in forms and details may be made without departing from the spirit and scope of the present application. It is therefore intended that the present application is not limited to the exact forms and details described and illustrated but fall within the scope of the appended claims.

What is claimed is:

1. A 2D microfluidic structure comprising:
a first substrate located above at least one microfluidic channel; and
a second substrate located below the at least one microfluidic channel, wherein the first substrate comprises at least one first group of three isolated electrodes and the second substrate comprises at least one second group of three isolated electrodes, wherein the at least one first group of three isolated electrodes and the at least one second group of three isolated electrodes each comprises a ground electrode and two probe electrodes.

2. The 2D microfluidic structure of claim 1, wherein at least one of the probe electrodes of the at least one first group of probe electrodes and at least one of the at least one second group of probe electrodes extend into the at least one microfluidic channel.

3. The 2D microfluidic structure of claim 1, wherein each of the electrodes of the at least one first group of three isolated electrodes includes a vertical element that extends through a through via present in the first substrate, and each of the electrodes of the at least one second group of three isolated electrodes includes a vertical element that extends through a through via present in the second substrate.

4. The 2D microfluidic structure of claim 1, further comprising a spacing element located between the first substrate and the second substrate.

5. The 2D microfluidic structure of claim 4, wherein the spacing element is present at each end of the at least one microfluidic channel.

6. The 2D microfluidic structure of claim 4, wherein a thickness of the spacing element determines a height of the microfluidic channel.

7. The 2D microfluidic structure of claim 1, wherein the probe electrodes that extend into the at least one microfluidic channel are coaxial with the ground electrode.

8. The 2D microfluidic structure of claim 1, wherein a first probe electrode of the at least one first group of three isolated electrodes is mated with a first probe electrode of the at least one second group of three isolated electrodes, and the second probe electrode of the at least one first group of three isolated electrodes is mated with a second probe electrode of the at least one second group of three isolated electrodes.

9. The 2D microfluidic structure of claim 1, wherein the probe electrodes are composed of a transparent electrically conductive material.

10. The 2D microfluidic structure of claim 9, wherein the probe electrodes are composed of a non-transparent electrically conductive material.

11. The 2D microfluidic structure of claim 1, further comprise a contact pad contacting each of the electrodes of the at least one first group of three isolated electrodes and each of the electrodes of the at least one second group of three isolated electrodes.

12. The 2D microfluidic structure of claim 1, further comprising a dielectric material encasing each of the electrode of the at least one first group of three isolated electrodes and each of the electrodes of the at least one second group of three isolated electrodes.

13. The 2D microfluidic structure of claim 1, wherein each first group of three isolated electrodes and each second group of three isolated electrodes define a microfluidic cell.

14. The 2D microfluidic structure of claim 13, wherein in a column arrangement each microfluidic cell is arranged in-line with each other.

15. The 2D microfluidic structure of claim 13, wherein in a column arrangement each microfluidic cell is staggered relative to each other.

16. A system for sensing an analyte, the system comprising
    a 2D microfluidic structure comprising a first substrate located above at least one microfluidic channel, and a second substrate located below the at least one microfluidic channel, wherein the first substrate comprises at least one first group of three isolated electrodes and the second substrate comprises at least one second group of three isolated electrodes, wherein the at least one first group of three isolated electrodes and the at least one second group of three isolated electrodes each comprises a ground electrode and two probe electrodes;
    an integrated sensing circuit electrically connected to the 2D microfluidic structure; and
    an integrated reconfigurable crossbar switch electrically connected to the 2D microfluidic structure.

17. The system of claim 16, wherein each first group of three isolated electrodes and each second group of three isolated electrodes define a microfluidic cell.

18. The system of claim 17, wherein in a column arrangement each microfluidic cell is arranged in-line with each other.

19. The system of claim 16, wherein in a column arrangement each microfluidic cell is staggered relative to each other.

20. The system of claim 16, wherein both the reconfigurable crossbar switch and the integrated sensing circuit are electrically connected to a data acquisition device, and the data acquisition device wired to a data monitor where an acquired data is viewed.

* * * * *